(12) United States Patent
Leduc

(10) Patent No.: US 10,867,398 B2
(45) Date of Patent: Dec. 15, 2020

(54) METHODS, SYSTEMS, APPARATUSES AND DEVICES FOR FACILITATING MOTION ANALYSIS IN AN ENVIRONMENT

(71) Applicant: Reliance Core Consulting LLC

(72) Inventor: Jean-Pierre Leduc, Clarksburg, MD (US)

(73) Assignee: RELIANCE CORE CONSULTING LLC, Alexandria, VA (US)

( * ) Notice: Subject to any disclaimer, the term of this patent is extended or adjusted under 35 U.S.C. 154(b) by 126 days.

(21) Appl. No.: 16/231,004

(22) Filed: Dec. 21, 2018

(65) Prior Publication Data

US 2019/0156496 A1    May 23, 2019

Related U.S. Application Data

(63) Continuation-in-part of application No. 16/197,725, filed on Nov. 21, 2018.
(Continued)

(51) Int. Cl.
*G06F 3/03* (2006.01)
*G06T 7/292* (2017.01)
(Continued)

(52) U.S. Cl.
CPC ............ *G06T 7/292* (2017.01); *G06F 3/0325* (2013.01); *G06K 9/00624* (2013.01);
(Continued)

(58) Field of Classification Search
CPC ........... G06T 7/292; G06T 2207/20081; G06T 2207/20092; G06T 2207/30232; G06T 2207/30241; G06K 9/00624; G06K 9/00771; G06K 9/6267; G06K 9/00785; G06K 9/2018; G06K 9/6289; G06K 9/3241; H04L 12/66; H04N 5/247; H04N 7/17318; G06F 3/0325
See application file for complete search history.

(56) References Cited

U.S. PATENT DOCUMENTS 5,987,399 A * 11/1999 Wegerich ............... G21C 17/00
 702/183
6,256,046 B1 * 7/2001 Waters .................... G06F 3/011
 345/473

(Continued)

*Primary Examiner* — Joshua D Taylor
*Assistant Examiner* — Patrick A Ryan

(57) ABSTRACT

Disclosed herein is a system for facilitating motion analysis in an environment, in accordance with some embodiments. Accordingly, the system may include a plurality of motions sensors configured to be disposed in the environment. Further, the plurality of motion sensors may be configured to generate a plurality of motion data corresponding to at least one motion of at least one object in the environment. Further, the system may include a plurality of video cameras disposable at a plurality of key locations in the environment. Further, at least one video camera may be configured to transmit a part of a corresponding image sequence to a remote monitoring center through at least one gateway. Further, the system may include at least one gateway disposable proximal to the environment, which may be configured as a two-way interface capable of communicating with the remote monitoring center and the plurality of motion sensors.

16 Claims, 15 Drawing Sheets

Related U.S. Application Data

(60) Provisional application No. 62/617,502, filed on Jan. 15, 2018, provisional application No. 62/609,594, filed on Dec. 22, 2017, provisional application No. 62/589,287, filed on Nov. 21, 2017.

(51) Int. Cl.
  *G06K 9/00* (2006.01)
  *H04N 5/247* (2006.01)
  *H04L 12/66* (2006.01)
  *G06K 9/62* (2006.01)
  *G06K 9/32* (2006.01)
  *H04N 7/173* (2011.01)
  *G06K 9/20* (2006.01)

(52) U.S. Cl.
  CPC ....... *G06K 9/00771* (2013.01); *G06K 9/3241* (2013.01); *G06K 9/6267* (2013.01); *G06K 9/6289* (2013.01); *H04L 12/66* (2013.01); *H04N 5/247* (2013.01); *H04N 7/17318* (2013.01); *G06K 9/00785* (2013.01); *G06K 9/2018* (2013.01); *G06T 2207/20081* (2013.01); *G06T 2207/20092* (2013.01); *G06T 2207/30232* (2013.01); *G06T 2207/30241* (2013.01)

(56) References Cited

U.S. PATENT DOCUMENTS

| | | | |
|---|---|---|---|
| 7,362,911 B1* | 4/2008 | Frank | H04N 5/365 348/E5.081 |
| 9,332,616 B1* | 5/2016 | Modi | H05B 45/10 |
| 9,396,400 B1* | 7/2016 | Teichman | G06K 9/00771 |
| 9,454,820 B1* | 9/2016 | Kirmani | G06K 9/4661 |
| 9,509,968 B2* | 11/2016 | Zimmermann | H04N 21/4828 |
| 9,948,902 B1* | 4/2018 | Trundle | H04N 7/183 |
| 10,044,985 B1* | 8/2018 | Parker | H04N 7/18 |
| 10,078,328 B1* | 9/2018 | Slater | B64G 3/00 |
| 10,354,503 B1* | 7/2019 | Kostrun | F21V 23/0478 |
| 10,416,784 B2* | 9/2019 | Jones | G06K 9/00771 |
| 2003/0135971 A1* | 7/2003 | Liberman | B01D 67/0058 29/419.1 |
| 2004/0080618 A1* | 4/2004 | Norris | G08B 13/19608 348/207.1 |
| 2004/0240546 A1* | 12/2004 | Wells | H04N 7/181 375/240.12 |
| 2005/0069911 A1* | 3/2005 | Lee | B82Y 5/00 435/6.14 |
| 2005/0231855 A1* | 10/2005 | Tran | G11C 11/21 360/324.1 |
| 2005/0271266 A1* | 12/2005 | Perrier | G06K 9/00771 382/157 |
| 2006/0078047 A1* | 4/2006 | Shu | H04N 21/2187 375/240.01 |
| 2007/0036389 A1* | 2/2007 | Rhee | G06T 7/20 382/103 |
| 2008/0063400 A1* | 3/2008 | Hudson | G05D 1/0033 398/106 |
| 2009/0032683 A1* | 2/2009 | Knopf | G01J 1/42 250/208.1 |
| 2009/0059159 A1* | 3/2009 | Howell | G02C 11/00 351/41 |
| 2009/0225300 A1* | 9/2009 | Barrows | G06T 7/269 356/28.5 |
| 2010/0019169 A1* | 1/2010 | Hartmann-Thompson | G01N 31/221 250/459.1 |
| 2010/0148940 A1* | 6/2010 | Gelvin | H01Q 9/0464 340/286.02 |
| 2010/0157064 A1* | 6/2010 | Cheng | H04N 5/247 348/169 |
| 2010/0172545 A1* | 7/2010 | Lim | H04N 5/145 382/106 |
| 2011/0169950 A1* | 7/2011 | Weaver | G08B 13/1966 348/143 |
| 2011/0233382 A1* | 9/2011 | Solin | H01L 31/09 250/208.1 |
| 2011/0248151 A1* | 10/2011 | Holcombe | G01J 1/44 250/221 |
| 2012/0188344 A1* | 7/2012 | Imai | H04N 9/045 348/47 |
| 2012/0314081 A1* | 12/2012 | Kleihorst | H04N 7/181 348/159 |
| 2013/0321581 A1* | 12/2013 | El-Ghoroury | H04N 5/2257 348/46 |
| 2014/0024313 A1* | 1/2014 | Campbell | G06Q 50/02 455/41.2 |
| 2014/0291479 A1* | 10/2014 | Lu | H01L 27/1443 250/200 |
| 2014/0333775 A1* | 11/2014 | Naikal | G06K 9/00711 348/159 |
| 2014/0340487 A1* | 11/2014 | Gilliland | H04N 13/167 348/48 |
| 2014/0368606 A1* | 12/2014 | Bassi | H04N 13/305 348/36 |
| 2015/0334299 A1* | 11/2015 | Tsuneno | H04N 5/23206 348/36 |
| 2016/0003493 A1* | 1/2016 | Katz | F24F 11/30 700/275 |
| 2016/0004390 A1* | 1/2016 | Laska | G06F 3/0482 715/723 |
| 2016/0146800 A1* | 5/2016 | O'Driscoll | G01N 21/253 506/9 |
| 2016/0189500 A1* | 6/2016 | Kim | G08B 13/19645 386/223 |
| 2016/0253906 A1* | 9/2016 | Celikkol | G08C 23/00 701/21 |
| 2016/0259337 A1* | 9/2016 | Ruffier | G01C 21/20 |
| 2016/0334276 A1* | 11/2016 | Pluvinage | G01J 3/28 |
| 2017/0061783 A1* | 3/2017 | Nalukurthy | G08B 26/008 |
| 2017/0067763 A1* | 3/2017 | Kodeswaran | G06N 7/005 |
| 2017/0220037 A1* | 8/2017 | Berestov | H04N 5/23203 |
| 2017/0253330 A1* | 9/2017 | Saigh | B64C 39/024 |
| 2018/0012370 A1* | 1/2018 | Aghamohammadi | G06T 7/50 |
| 2018/0180314 A1* | 6/2018 | Brisette | G05B 13/048 |
| 2018/0376090 A1* | 12/2018 | Liu | G01J 1/44 |
| 2019/0011921 A1* | 1/2019 | Wang | G05D 1/0094 |
| 2019/0018416 A1* | 1/2019 | Gassend | G05D 1/0094 |
| 2019/0042868 A1* | 2/2019 | Oesterreicher | G06T 7/521 |
| 2019/0114804 A1* | 4/2019 | Sundaresan | G06K 9/66 |
| 2019/0248492 A1* | 8/2019 | Roldan De Perera | B64C 27/37 |

* cited by examiner

METHODS, SYSTEMS, APPARATUSES AND DEVICES FOR FACILITATING MOTION ANALYSIS IN AN ENVIRONMENT

The current application is a continuation-in-part (CIP) application of a U.S non-provisional application Ser. No. 16/197,725 filed on Nov. 21, 2018. The U.S. non-provisional application Ser. No. 16/197,725 claims a priority to a U.S. provisional application Ser. No. 62/589,287 filed on Nov. 21, 2017.

The current application also claims a priority to the U.S. Provisional Patent application Ser. No. 62/609,594 filed on Dec. 22, 2017.

The current application also claims a priority to the U.S. Provisional Patent application Ser. No. 62/617,502 filed on Jan. 15, 2018.

TECHNICAL FIELD

Generally, the present disclosure relates to the field of data processing. More specifically, the present disclosure relates to methods, systems, apparatuses and devices for facilitating motion analysis in an environment.

BACKGROUND

Motion analysis may be used for motion detection and/or moving target recognition applications. These applications may include motion analysis in sports fields, militarized sites, or even in research laboratories etc.

Further, the drawback of conventional motion analysis systems that may be based on numerous video cameras are multi-fold and the following itemizes the most important disadvantages:

1. At a sensor layer, the trends in constructing video cameras are to move to higher and higher pixel density in order to improve the image resolution. Increasing the resolution diminishes the sensitivity. But sensitivity is the property needed to detect changes of contrast in the observed scene and especially in dim light. The move to high sensitivity leads to using detectors that work each as an independent pixel that count photons. High sensitivity requires to develop large fields of view, a move that diminishes the resolution.

2. At the telecommunication layer, each video camera produces a compressed bit rate of several megabits per second (Mb/s) that has to be transmitted in real time, or stored but not yet analyzed to detect motion. For example, compressing HD video with an original sampling resolution of 1920×1080 pixels using an MPEG4 standard with a constant frame rate of 24, 25 or 30 progressive images per second (image/s) generates bitrates that range from 5,000 to 10,000 Kbit/s. The file-size of the compressed video may range from about 400 MB to 750 MB (MegaBytes) after 10 minutes and 6 times those amounts after one hour.

3. At the application layer, all video information still need to be analyzed in real time to unfold the embedded motion.

Therefore, the "camera-everywhere" involves a huge amount of data that needs:

To be transmitted that would overpower the telecommunication network, and,

To be processed by the application layer that would be untraceable or unmanageable in real time for an intelligent system.

Therefore, there is a need for improved methods, systems, apparatuses and devices for facilitating motion analysis in an environment that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Further disclosed herein is a system for facilitating motion analysis in an environment, in accordance with some embodiments. Accordingly, the system may include a plurality of motions sensors configured to be disposed in the environment. Further, the plurality of motion sensors may be configured to generate a plurality of motion data corresponding to at least one motion of at least one object in the environment. Further, the system may include a plurality of video cameras disposable at a plurality of key locations in the environment. Further, each video camera may be configured to capture image sequences associated with a portion of the environment. Further, at least one video camera may be configured to transmit a part of a corresponding image sequence to a remote monitoring center through at least one gateway. Further, the system may include at least one gateway disposable proximal to the environment. Further, the at least one gateway may be configured as a two-way interface capable of communicating with the remote monitoring center and the plurality of motion sensors. Further, the remote monitoring center may include a processing device configured for analyzing the plurality of motion data and the image sequences. Further, the processing device may be configured for generating at least one trajectory data corresponding to at least one trajectory associated with the at least one object based on the analyzing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
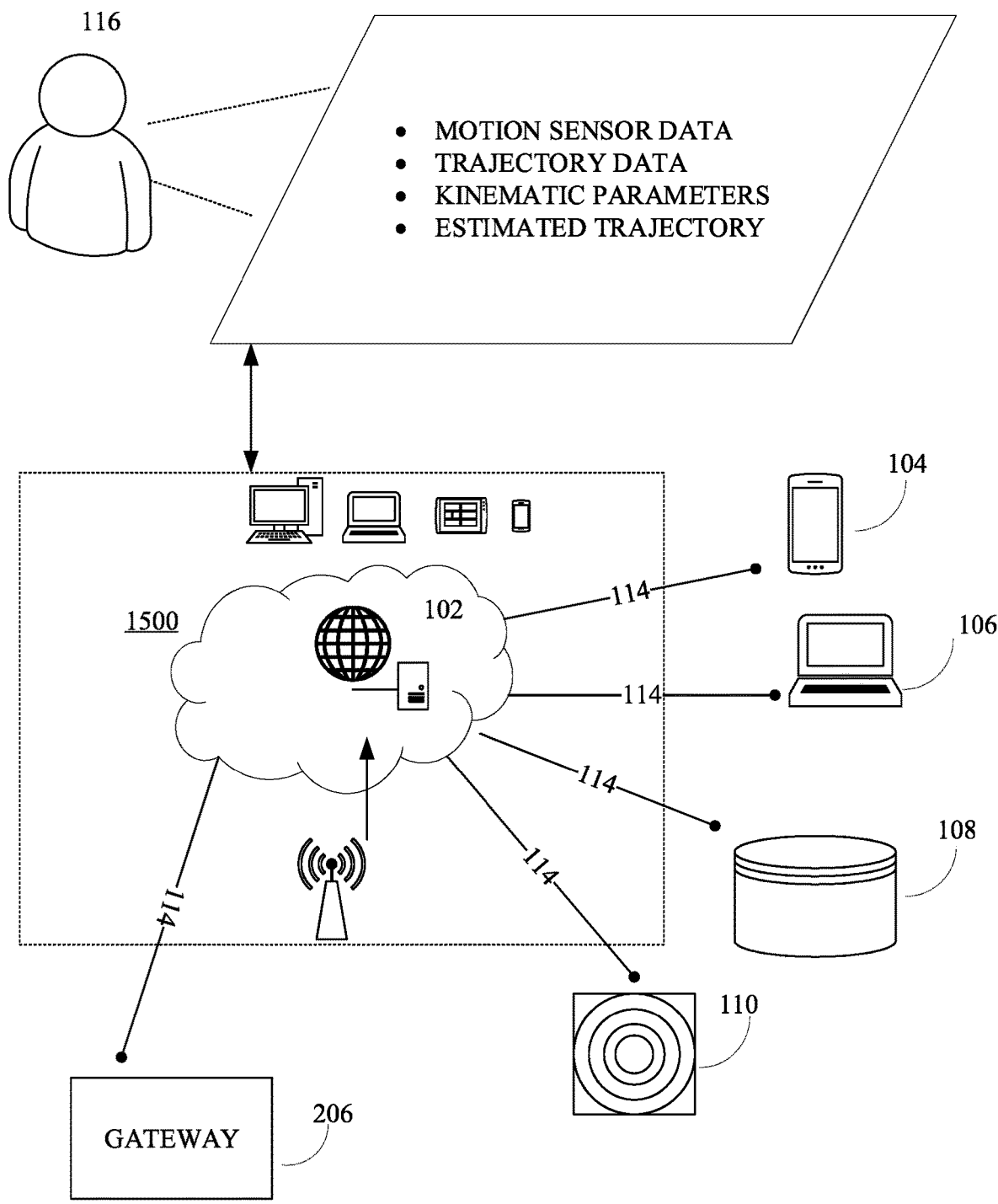
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of motion analysis in an environment, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Figure 10:
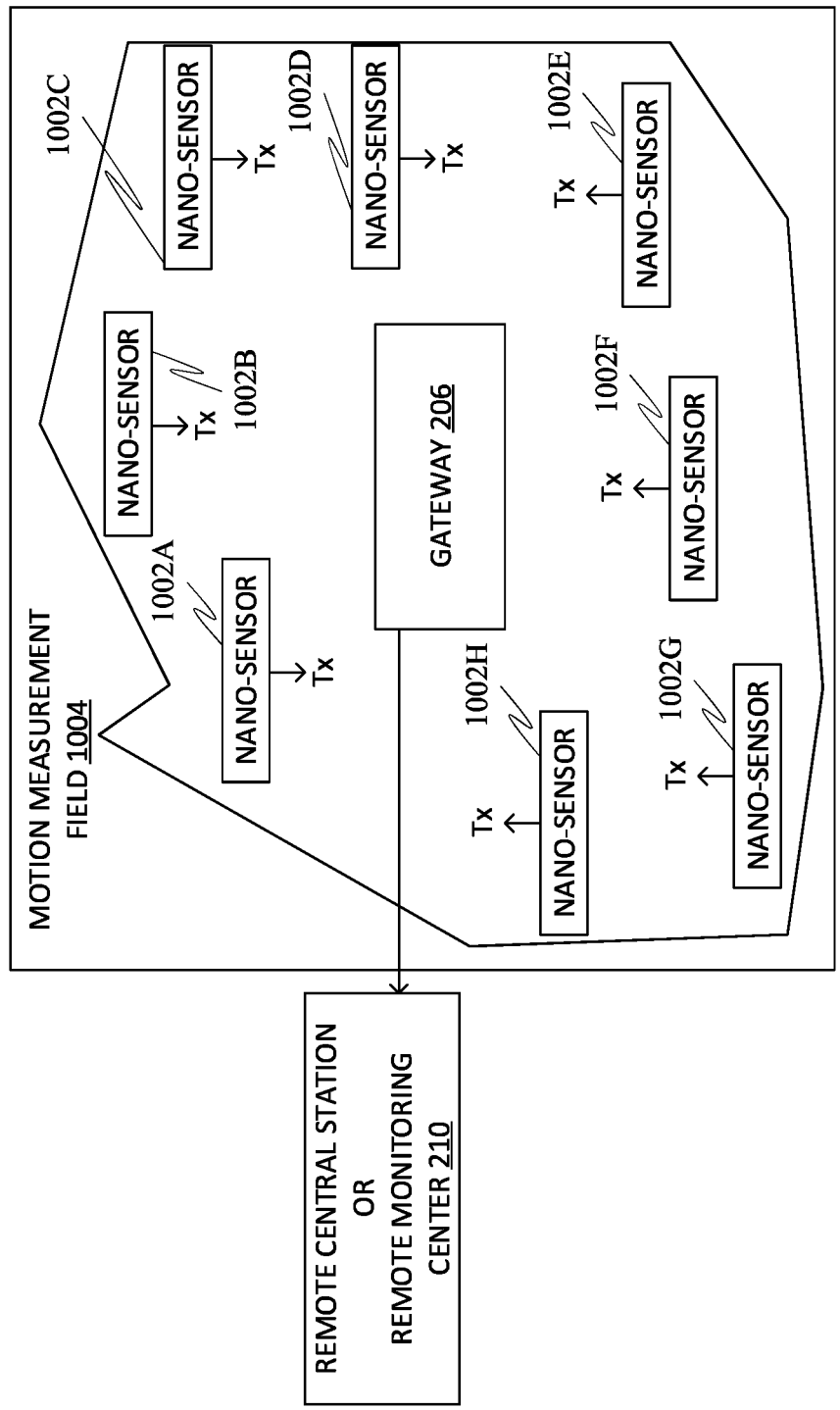
FIG. 10 shows an exemplary block diagram representation of the motion sensor network for motion analysis, in accordance with some embodiments.

Overview:

To introduce a concept of the present disclosure, this project intends to develop a complete motion-intelligent system that performs three-dimensional motion analysis, supervision, and control on a delimited field out of the physical world. This field defines a space of interest to be monitored. The space of interest becomes a three-dimensional space and time referred here by the acronym "3D+T". Examples of such fields are commercial and business premises, residential, public and administrative buildings, parking garages, transportation stations or undergrounds, airports, private properties, city streets, and battlefields. Further, with reference to FIG. 10, the motion analysis may be performed from digital signals captured from multiple sensors distributed on the field (such as motion measurement field 1004). Those different sensors may be assembled and communicate through a telecommunication network. The sensors belong to categories such as Motion-sensor (such as nano-sensors 1002A-H) as passive photodetector arrays randomly spread on the field as shown in FIG. 10. Further, the sensors may belong to categories such as multiple video cameras situated in key locations. Further, the sensors may belong to categories such as active motion-measurement devices based on ultrasonic, microwave, or laser radars. Further, the sensors may belong to categories such as specialty sensors as walk-through systems detecting radioactive or chemical sources, moving metal pieces on key spots.

Further, information which may be collected from the sensors may be relayed by routers to a gateway 206. The gateway 206 may operate as a data sink that transmits all the aggregated information to a remote monitoring center 210 where the information may be processed and analyzed. Further, the motion analysis may include (but not limited to) motion detection of moving patterns, Motion-oriented classification & selection on the detected moving patterns, Estimation of the kinematical parameters (Kinematical parameters may include velocity, position, scale, and orientation), Prediction of the kinematical parameters, Tracking to build trajectories of moving patterns of interest, and/or Focalization on patterns of interest etc.

The motion analysis may be performed by sensing electromagnetic waves for which physical properties may have been transformed by the moving objects. In this context, motion analysis may be performed passively or actively. To address applications, the entire system can be subdivided into three components as presented in FIG. 8.

Figure 8:
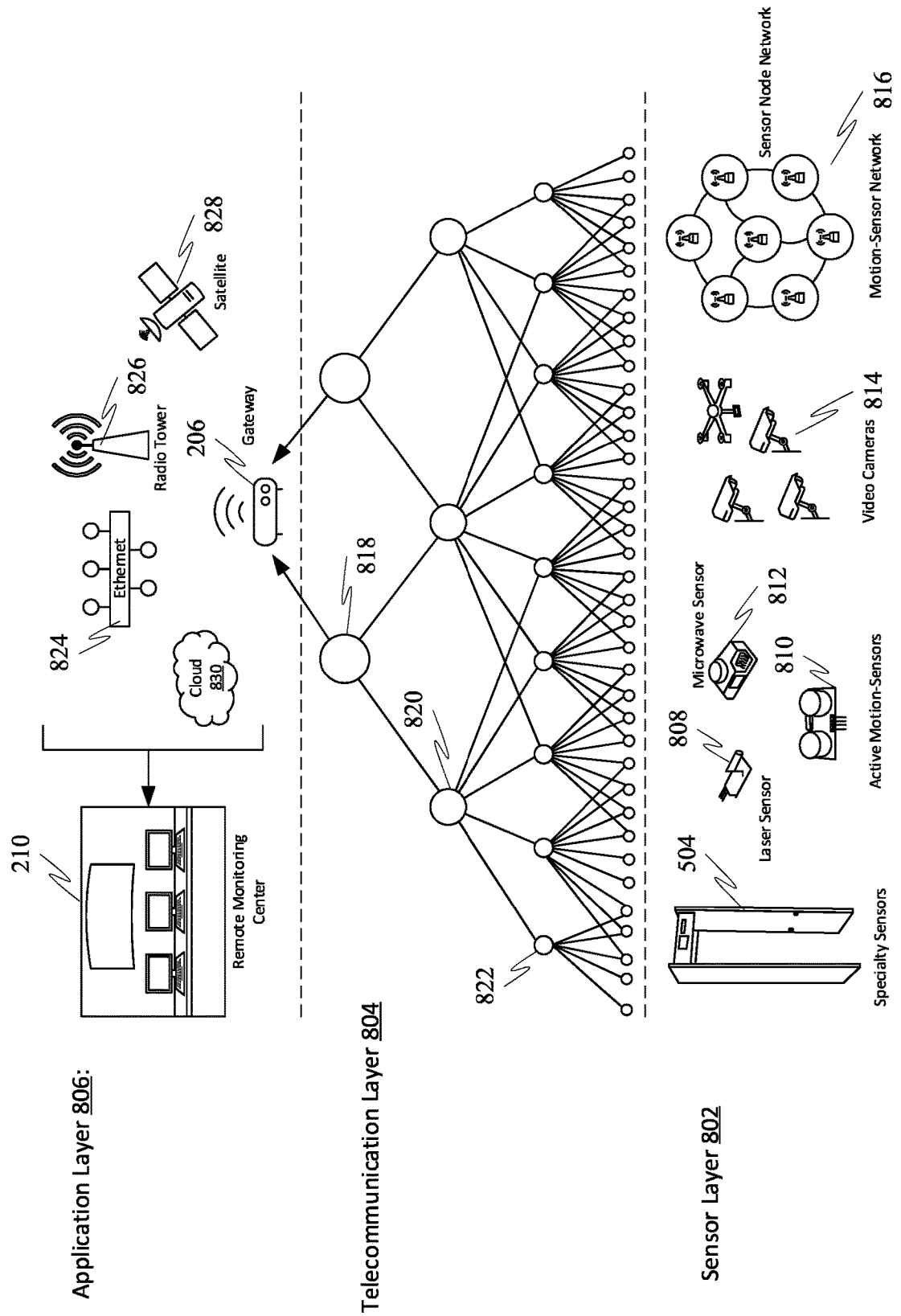
FIG. 8 shows three layer internet-of-things (IoT) architecture for motion analysis, in accordance with some embodiments.

1. A sensor layer 802 (as shown in FIG. 8), in an instance, may be the lowest physical layer responsible for the detection and the measurement of kinematical parameters. The sensor layer 802, in an instance, may include different type of sensors as described here above (such as specialty sensors 504, laser sensors 808, active motion sensors 810, microwave sensors 812, video cameras 814, motion sensor network 816 etc.).

2. A telecommunication layer 804 (as shown in FIG. 8), in an instance, may be in charge to transmit collected information to a gateway 206 or a data sink. Further, the telecommunication layer 804, in an instance, may include an upper physical layer (such as a layer of routers (such as router 818), detectors, and/or components responsible for carrier generation, modulation and frequency selection etc.), a data link layer (such as sub-routers 820), and/or a network layer (such as sub-sub-routers 822).

3. The application layer 806, in an instance, may include a transport layer (the Internet, radio or satellite communications through an Ethernet 824, a radio tower 826, and/or a satellite 828 respectively) and an application layer (the Cloud 830, workstations specialized in Artificial Intelligence especially deep learning neural networks).

Further, the motion-intelligent system, in an instance, may mimic the work performed by human sensory systems spread on the skin. Adapted for the present application, the sensory system spans an entire physical field of interest. Motion-intelligent system applications perform a motion analysis, supervision, and control that fall in two modes of operation which may be namely passive or active.

Further, in passive schemes, motion analysis may be performed like a human perception in the cortex that performs as a supervisor of motion. Passive sensors capture propagating waves that may be emitted from an external source, usually in a visible spectrum, and may be reflected by the moving targets. Sensors may also capture waves that are produced by the moving object itself, for instance, if an object is thermally warm or hot. A classic example of such a sensor is the thermal infrared camera.

Further, in active schemes, the motion analysis may derive accurate measurements that enable fine control and action on the environment. Active sensors may perform actions such as produce the analyzing waves (acoustic, microwaves) in the field, or collect the reflected waves, or compute relative velocities of the target from the Doppler shift, and/or perform echolocation through phase difference and time delay.

Figure 9:
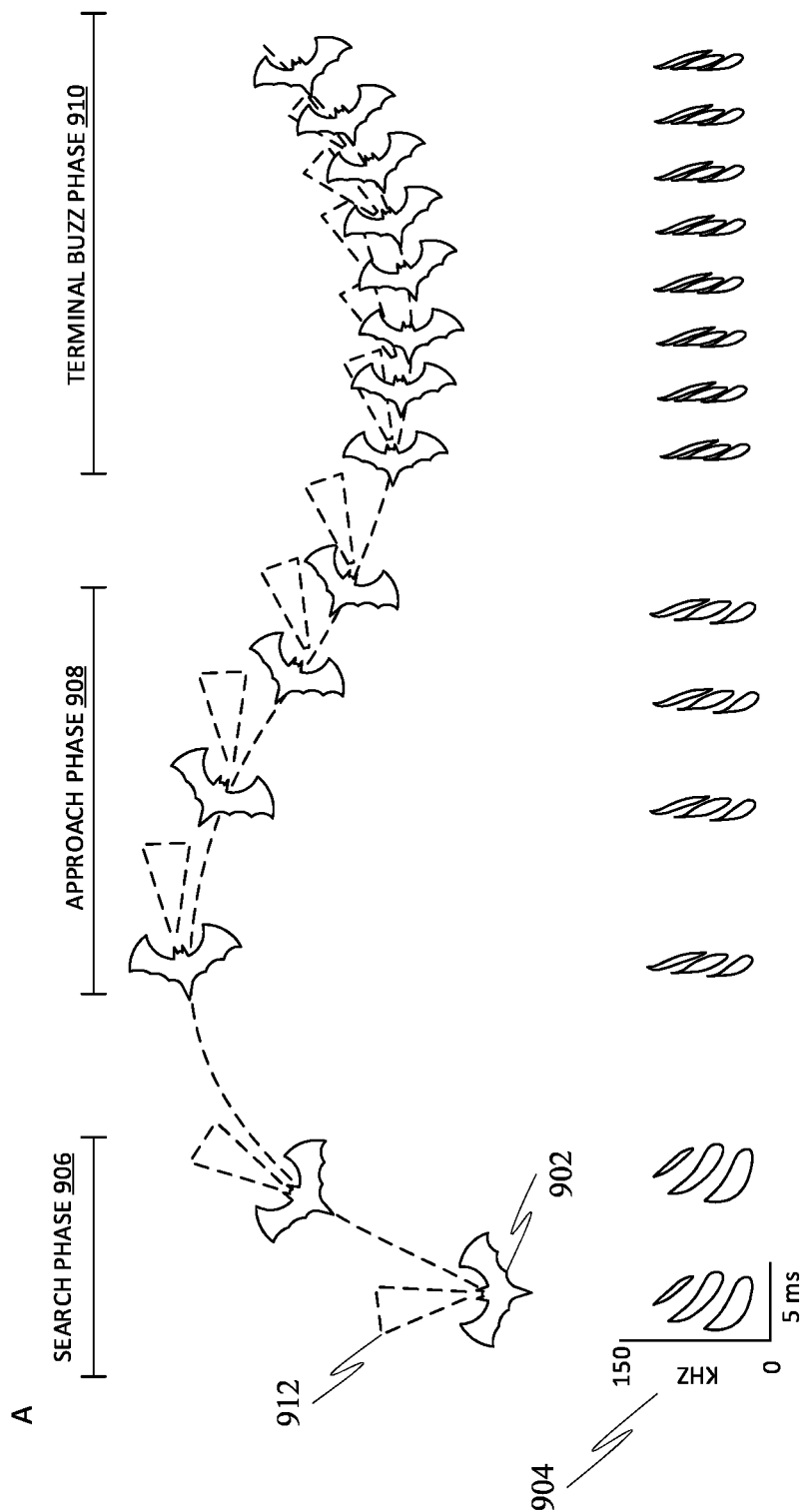
FIG. 9 shows the motion analysis with auditory system, in accordance with some embodiments.

Further, in an active scheme, the motion analysis may proceed up to a final locked control on the pattern of interest. The analysis may include three successive phases outlined as first, the search phase 906 (as shown in FIG. 9) proceeds with a large spectrum recognition. Second, the approach selects a target or patterns of interest (such as an approach phase 908, as shown in FIG. 9). Third, the terminal phase (such as a terminal buzz phase 910, as shown in FIG. 9) captures or recognizes the pattern.

Further, the intelligent-motion analysis and control based on a sensor network to be developed in this application work in the whole analogy with biological sensory systems. The sensory system transduces signals in form of wave energy originating from the physical world where motion takes place into information. Only the useful information may be able to reach the brain through a gateway. In the brain, the information is analyzed by the cortex. Motion analysis, in an instance, may be performed by three different types of biological systems that perform motion analysis, supervision and control. Those biological systems provide a perfect analogy to the intelligent-motion control system implemented in the present disclosure. Further, such systems are known as auditory systems (as shown in FIG. 9), Visual systems (such as a human eye system), and/or cutaneous sensory system.

Further, each of those biological systems may be composed of three main components such as Sensors located at the periphery on the field (skin), Nerves that work as a bundle or a network of "telephone" lines and transmit to the brain the useful information collected and filtered by the sensors, and intelligent areas in the cerebral cortex that have learned and acquired at an initial age both the topographic mapping of the body and the way how to generate a conscious perception of motion.

Further, with reference to FIG. 9, auditory systems rely on ears as sensors and bring forth an opportunity to implement sonars and echolocation as rooted in bats (such as a bat 902, as shown in FIG. 9) and dolphins (not shown). The motion analysis in the ears implements a time-frequency analysis 904 which may be based on a continuous wavelet transform technique. Further, the bat 902, in an instance, may use sonar beam 912 in order to search for a prey in the search phase 906. Further, the bat 902 may select and/or target the prey in the approach phase 908. Further, the bat 902, in an instance, may capture the prey in the terminal buzz phase 910.

Further, the visual systems rely on eyes as sensors. In the human visual system, the transmission network may be based on a bundle of nerves that end up on two gateways in the brain located in lateral geniculate nuclei. From the geniculate nuclei, the information is spread and analyzed in the primary visual cortex. In the human eye, the information is split into two components. A spot in the retina, called the fovea, creates high-resolution images from a high-density photoreceptor grid that enables visual recognition and classification. At a periphery of the retina around the fovea, a network of sparse photoreceptors may be involved in motion detection and tracking.

Further, Cutaneous sensory systems rely on sensors, for example, mechanoreceptors, non-uniformly spread over the entire skin. According to the interest, some areas have higher sensor density. A transmission network concentrate and bundle in the spinal cord. The sensory pathway synapses at the brain proceeds to a gateway located in the thalamus. From the thalamus, the information may be spread into the brain to reach the cerebral cortex at a perfect location for conscious perception on a body map that was originally learned.

Two competitive methodologies may be used for a "3D+T" intelligent motion analysis, supervision and control of a field of interest. Further, the different approaches may include an approach where the motion analysis may be performed from a set of numerous video cameras distributed in the field. The so-called "camera-everywhere" approach. Further, the motion analysis performed through motion sensors scattered in the field and a restricted number of video cameras located at selected spots.

To compare both approaches, consider a motion-detector composed of 8×8=64 sensors, where each sensor generate 12-bit samples. At a change of contrast, the information may be estimated at a maximum of about 1 Kbit encoded data per second over the period when intensity varies. At that rate, the local system may have to involve 10,000 sensors permanently to reach the level of a video-camera data rate.

As a matter of comparison with nature, evolution has chosen to develop a network of sensory systems that may be composed of different specialized motion sensors spread at the body periphery on the skin. The sensor density may be variable and locally adapted to the necessity or the need. A network of nerves communicates the useful information to the cortex through a telephone line system bundled in the spine. The information reaches the cortex after passing through a gateway that relays the signal to the centers of interest. In the cortex, the transmitted signal produces a perception with intensity and localization on the topographic map of the acquired body representation.

Further, the motion detection may be performed in the eyes at the periphery of the retina through a sparse system of photodetectors. The visual system orients the eyes and the fovea to the sensitized skin spot or towards the detected motion to get a high-resolute image of the pattern of concern. The Human detection system may be based on multiple specialized sensor networks, one integrated eye, and a multi-brain where specialized and optimal detection relies on networks of scattered sensors. Further, specialized high resolution images may rely on one single visual system. Further, specialized pattern analysis and recognition supervision and control may rely on the cortex which performs as a multi-brain. Further, such construction may be more efficient for the two reasons. First, it minimizes the quantity of information to be transmitted and to be handled by the cortex. Second, it relies on different contributing functions each optimally designed for their purpose. Restated in other words, the design of a human body with eyes everywhere would lead to an inefficient and intractable system which would request a bundle of high data rate transmission line and would flood the cortex of information. In the cortex, each source would request its own specific processing system to extract the useful content.

Further, the present disclosure, in an instance, may carry out a design of a motion-intelligent system that performs motion analysis, supervision and control from the digital signal captured from a network of motion sensors scattered over a physical field of interest and from multiple video cameras where "3D+T" motion analysis aims at being performed. Further, the motion analysis means not only motion detection, motion-based classification and recognition of moving patterns but also estimation, prediction and tracking of kinematical parameters to build trajectories. Further, the recognition and classification of moving pattern include a selection through scale and orientation. Shape recognition involves size, volume, and shape. Orientation recognition involves the perception of main alignment like horizontal, vertical, degree of inclination. Further, the kinematical parameters may be defined as spatial and temporal positions and velocity or speed. Further, the velocity is a vector with three components and the speed is defined as the magnitude of the velocity vector. Further, the contribution of video cameras, in an instance, may be to provide the system with high-resolution images at locations that may be crucial for the recognition and classification of moving patterns. The contribution of the motion sensor network, in an instance, may be to bring motion detection, estimation, and tracking capabilities.

Further, an operator may actively spread motion sensors randomly over the entire physical field of interest. The entire system may be described following a bottom-up approach and decomposed into three major components as introduced earlier in FIG. 8. Those components may include a set of different sensors (that captures motion, measurement and moving-image information, converts them into data to be transmitted), a tree-structured telecommunication system relays the data from the sensors to a data sink, a motion-intelligent supervising system that may receive the data.

Further, the motion sensor, in an instance, may be nodes located at the bottom of the entire networking system. The following proceeds to a detailed bottom-up description of the system.

The motion sensor nodes implement all the functions of the physical layer of the system. Those functions may be responsible for signal detection, analog-to-digital conversion, entropy coding of the useful information into data to be transmitted with potential error correcting codes and encryption. The node uses an appropriate carrier frequency and an efficient modulation technique.

The number of motion sensor nodes in the network, in an instance, may be supposed to be very high. A network may count a few hundred thousand to millions of motion sensor nodes. Two important properties and factor driving the design of motion-intelligent sensor networks shall be fault tolerance and scalability. Those characteristics may serve as a guideline to design a protocol of communications inside the network.

Fault tolerance supposes that some sensor may fail to work momentarily by lack of power of permanently by enduring physical damage. The failure of sensor nodes may not affect the overall task of the sensor network. By definition, fault tolerance may be the ability to maintain sensor network functionalities without any interruption due to sensor node failures. The survival probability of a node, meaning the probability not to have a failure, within a time interval (0, t) may be given in the whole generality by a Poisson process:

$$P_k = e^{-\lambda k t} \quad (1)$$

where $\lambda k$ is the failure arrival rate for a sensor node k and t is the time period. Further, failure may also occur by cluster when a router located at a network node is failing or by any other means of subfield destruction.

The scalability may be relating to the fact that density of sensor may be scalable and may vary from region to region from a few sensors nodes in some areas to a few hundred of sensor nodes in some other areas. The density $\mu$ may be calculated following the formula:

$$\mu(R) = (N\pi R^2)/A \quad (2)$$

where N is the number of scattered sensor nodes in area A, R is the radio transmission range.

Further, the telecommunication network has a hierarchical structure bottom up on the physical layer connecting sensors to sub-routers, a hierarchy of sub routers connects to routers, and the layer of routers connected to one gateway at the top of the tree structure. The structured telecommunication network implements the data link layer and the network layer of the system. The data link layer may be responsible to establish the communication links for the data transfer following an infrastructure of multi-hop wireless communications, to ensure reliable point-to-point or point-to-multipoint communications, to multiplex or aggregate the data collected from the sensors, to effectively share the telecomunication resources on the basis time, energy and frequency. The network layer may be responsible to aggregate all the data potentially using additional intermediate nodes as relays and to eventually route the total information to a data sink (the gateway) located at the periphery outside the sensor field. The architecture of this telecommunication network shall adapt to the specific structure of the field of interest and its division into subfields. The physical field of interest may be decomposed or divided into a hierarchy of subfields. Each subfield corresponds to a specific area or section of the field with its own properties, characteristics of interest. Each subfield may be controlled by one main router. Since a subfield may still be divided into smaller areas, each router may control a set of sub-routers. Each router or sub-router may have the ability to perform networking functions that are more complicated than those performed by the detector. Routers may be made of different technology, size, and radio communication capabilities. All routers eventually connect to one gateway which connects the entire system to a remote monitoring center through another network (Internet, satellite, radio). The Internet or other built-up external networks constitute the transport layer that connects the sink to the remote monitoring center.

Further, the motion-intelligent supervising system located at a remote monitoring center manages the functionalities of the system. The remote monitoring center implements the application layer of the system. The incoming data provided by the gateways may be processed in four major steps. First, the incoming data may be re-conciliated and reconstructed in "3D+T" on the acquired topography of the field. Second, a deep learning artificial neural network supervised by an expert system implements the motion analysis of detection, recognition, and classification of moving pattern including abnormalities, incidents, and accidents. Third, a human supervision follows through to interpret all abnormal events and give more insight to the system. The supervisor may induce a top-down control forcing the system to up-date the knowledge of the environment, to activate additional sensors through routers, to involve video cameras moving with robots or drones, to focalize and perform a locked control for pattern recognition, measurement or capture. Further, a deep learning artificial neural network supervised by an expert system performs additional prediction on the kinematical parameters, data analytics, and trajectory construction. Fourth, all data, in an instance, may be recorded and the systems may produce, on demand in real time or delayed, all sorts of statistics performed on different terms varying from real-time, short terms hourly and daily to long terms monthly and yearly.

Further, the motion-intelligent system may be based on a deep learning neural network. The deep learning system needs to be initially trained and evaluated. Further, the deep learning system may also request to be updated when changes occur in the environment. An adaptive dual control enables that a Q-learning function takes actions from different sources such as the deep leaning estimation that may be trained and updated to acquire the statistics of the environment, has learned and updated its capability of detection, recognition and classification, measurement and tracking. Further, expert system computations based on both the actual model of motion mechanics and the local topography of the system. Further, precise measurements performed by active sensors in a locked mode. Further, the supervisor decision.

Further, at the remote monitoring center 210 (as shown in FIG. 8), the data originating from the gateway 206 may be analyzed for detection, recognition and classification are presented in real time to the supervisors. The supervisors may have a possibility to select moving patterns of interest to be tracked and captured by the video cameras. Further, the system classifies all detected motions, classified them by scale, shape and any other criteria, performs pattern recognition from the cameras, estimate the trajectories from the data collected by the sensor system as far as it is feasible by real-time processing. All collected data may be recorded to enable further off-line analyses and to perform statistics.

Further, once activated, each motion sensor communicates with a router wirelessly. Each motion sensor encodes and transmits the innovative information of the changes of contrast captured from the photodetector array at a pace requested by the environment changes. The transmitted data may be composed of sampled detector measurements in term of intensity and position entropy encoded for transmission, of time stamps, and sensor identification. In a usual setting, motion sensors may be fixed on the surfaces of construction buildings such as walls and ceilings. The motion sensors capture moving light by photodetection. In addition to the motion sensors, some other sensors may be installed in the field. These additional sensors may be categorized as follows in a usual application:
1. A set of video cameras.
2. A set of passive sensors for specific detection.
3. A set of active sensors for precise motion measurements.

Further, on the field, a set of video cameras may be deployed on the field at key spots to catch high-resolution images and videos. All video cameras may transmit video signals wirelessly through their related routers to reach the gateway which may act as the data sink. At the data sink, the information may be transferred through the Internet or another type of network or communications (like satellite) to the remote monitoring center. Additional passive sensors may be deployed over the field in limited number in the field to detect critical information of interest like sounds and acoustics and moving patterns carrying radioactive sources, metal/weapon, or dangerous chemical. The detection may enable the system to label or mark the moving patterns to trace a motion path, to determine the location of entrance in the field, to track position and velocity, and eventually, to allow recognition or capture. Additional active sensors may be deployed based on the use of ultrasounds, microwaves, and lasers to perform complementary precise measurements of position and velocity as radars or echolocation as sonars.

Further, at the remote monitoring center, the raw incoming data provided by the gateways may be processed in three major steps. The first step may consist of a data reconciliation. Raw data may be reconciled and re-ordered by time and space. The algorithm proceeds with the first stage of analysis which performs motion detection and estimation performed from the sensors that are active on the field and with pattern classification and recognition from a video camera. Second, the system may allow receiving human intervention to give the ability to focus on events of interest. Third, the second step of analysis may be moved further in the motion analysis with motion prediction and trajectory estimation.

Further, the first step may consist in a data reconciliation to reconstruct the field in "3D+T" by fusing all the data originating from all types of sensors and the video camera along with other data describing the topography of the field. This stage involves a process called inverse problem to detect and estimate motion parameters of interest from the data produced by the sensor network followed by a process of pattern recognition and motion-based classification. The pattern recognition may be refined and/or completed from the data produced by the video cameras. Further, the first step involves a motion analysis performed by a deep learning neural network and an expert system. The deep learning neural network works and proceeds from the experience acquired during the training and updates which may be a bottom-up approach. The expert system may work and proceed from the accurate models derived from the physics of mechanics and waves which may be a top-down approach. The expert system operates in parallel to the neural network to implement an accurate model of motion as it takes place in the field taking into account the model of sensors and of the field topography. In this framework, the motion detection and the estimations performed by the neural network may be supervised, controlled and potentially adjusted by the expert system. The deep learning neural network will proceed further to detect, recognize and characterize incidents, accidents, abnormalities of all kinds (behavioral, intrusion, fire, shots, explosions, etc.).

Further, the deep learning neural network along with the expert system may be able to analyze the captured signals according to different motion parameters of interest. Such motion parameters may be defined as follows from different spatiotemporal transformations. The algorithm incorporates the following transformation parameters:
1. Spatial and temporal translations, with respective parameters denoted by $b \in R^3$ and $\tau \in R$, provide the spatial and temporal location.
2. Spatial rotation, with matrix parameter denoted by $r \in SO(3)$ (rotation on the sphere), provides the orientation.
3. Spatial dilation, with parameter $a \in R^{*+}$ (positive non-zero real number) provides the scale.
4. Velocity transformation with parameter $v \in R^3$.

Further, at this stage, human supervision may be required to provide an interpretation of some scenes. The human intervention may further work to provide feedback on the system of video cameras to focus on areas of interest. Further, at a most sophisticated level, the human intervention may use robots or drone to focus some camera on the site of interest. Feedback on the sensor network may also be activated by requesting that sub-routers activate more sensors in the area of interest or in areas where the inverse problem may require to be enhanced with a higher sampling density. Such enhancement may be necessary to provide existing, unique and stable solutions for the current analysis under process.

The motion analysis may be performed in two fundamental modes. First, the use of overall human supervision. Second, the use of a neural network implementing a deep learning system working as a dual control.

Further, the later mode enables to take decisions that are based on a Q-learning function. The Q-learning function further relies on an expert system taking rational actions, on a trained system taking empiric actions and on locked systems taking precise measurements.

Further, the second step involves a motion analysis performed by a deep learning neural network in forms of a dual control system that predicts, tracks and constructs trajectories of interest. The process, in an instance, may compare two or more inputs and selects the optimal action to be taken by the Q-learning function. The first input may be provided by an expert system like a consciously calculated action (the rational action). The expert system computes the kinematical parameters from exact models that rely on theoretical mechanics as it takes place on the field and may be captured by the sensors. The second input may be the trained component which may be very fast since fully adapted like an unconscious nervous reflex (the empiric action). Further, the second input, in an instance, may be produced by a neurodynamic programming algorithm following a statistical model learned by the system at from the initial and later training. Further, at this stage, additional inputs may also be made accessible that originate from additional active motion sensors. Those sensors may be based on sonar or radar techniques (acoustics, microwaves or lasers) that perform accurate measurements on the field (the locked action).

Figure 11:
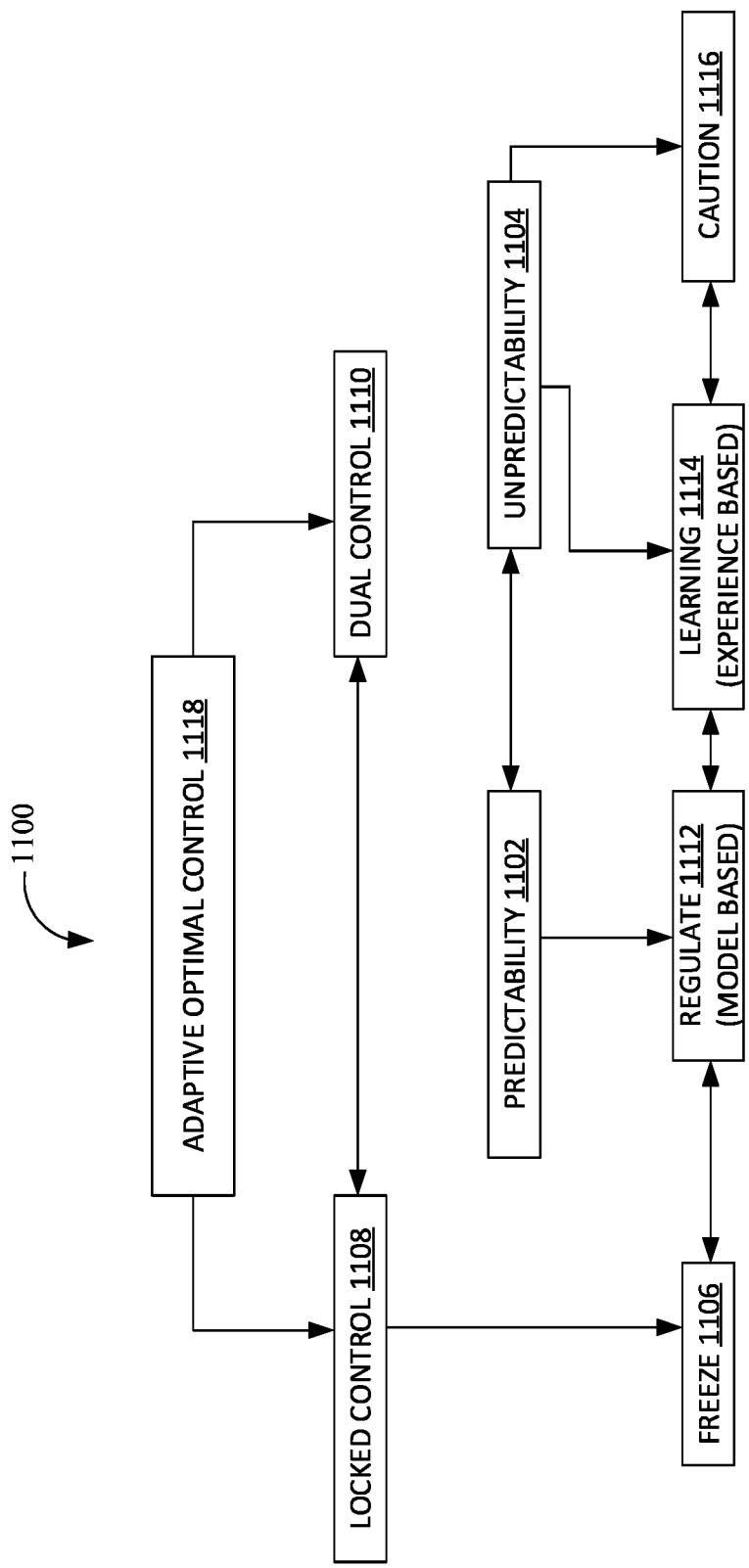
FIG. 11 shows an exemplary block diagram representation of a deep learning algorithm for dual control, in accordance with some embodiments.

Further, in the inverse problem, detection and motion analysis may be solved by a dual control process functioning on a deep learning neural network and an expert system. The way a dual control implements an adaptive optimal control 1118 may be pictured in FIG. 11. On situation of interest, an algorithm 1100 may freeze 1106 on specific patterns. Depending on a predictability 1102 or an unpredictability 1104 of the environment, the algorithm 1100 may make decisions based on two or more available chains of command such as regulate 1112, learning 1114, caution 1116.

Further, periods where the environment may be predictable, correspond to situations that have been learned during the training. On predictable situations, the deep learning algorithm (such as the algorithm 1100) may work as a stand-alone process that takes actions that rely to its training, meaning the training originally received at the initiation of the system or the latest training update. During the training periods, the weights or the hyper-parameters of the neural network were computed and adjusted for optimal motion analysis.

Further, on situations where the environment deviates from an acquired statistics and become unpredictable, the deep learning algorithm (such as the algorithm 1100) may take actions that refer to an exact model. The so-called expert system performs the optimal motion analysis but at a lower speed. The deep learning algorithm may need to be retrained or updated to the new environment statistics.

Further, on special situations where the neural network may rely on additional accurate motion measurements made by an active system (like Doppler measurements through ultrasonic, microwave or laser systems), a supervisor may freeze 1106 the control on the measurements performed by the active system. Applications of a locked control may also be implemented as the capture by a robot of a pattern moving in the field.

Further, the Q-learning function of the deep learning algorithm may allow the action to be selected from different sources. In this application, an adaptive process may be implemented and the actions to be taken can be determined following two control patterns which may be a dual control 1110 and a locked control 1108.

The dual control 1110 differentiates between situations that may be predictable to situations that are unpredictable. In a predictable environment where the model statistics are unchanged and correspond to the last training update, the action to be taken may follow and rely on the neural network supervised by the expert system. In situations where the model statistics may have or have changed, the environment becomes unpredictable. Exercising caution and learning become the prevailing rules. The determination of the optimal action to be taken may be changed by the supervisor in three different ways. First, follow the action computed by the expert system. Second, explore the new environment to learn. Third, follow the action computed from another source of measurements.

Further, the locked control 1108 may correspond to a possibility given to the supervisor to freeze 1106 on the system on a given target of interest. Further, latter option may be especially useful and efficient where active motion estimation may be performed through precise measurements using ultrasonic or laser systems and may be entered as selected action.

Further, specificities of this motion-intelligent system compared to any other systems may be that the system mimics the functioning of a generalized central and peripheral nervous system. Further, in this system, each component performs its work with the optimum efficiency such as the motion information may be captured by a mix of three categories of sensory systems each specialized for their own purpose, namely the cutaneous sensory system (the sensor network), the visual system (the video-cameras) and the auditory system (the echolocation and radars). Further, a network of communication transports the information and reach an intelligent cortex through routers and one gateway. Further, the artificial intelligence may originally acquire the topography of the field and performs motion analysis relying on two modes. One mode of analysis may be performed experimentally bottom-up and the other mode of analysis may be performed rationalistically top-down. Accordingly, those modes may include a Q-learning system relies on field training and updates and generates fast perceptions of motion (like through unconscious reflexes). Further, an expert system that may perform computations based on the actual physics of all the phenomena taking place in the field (mechanics, waves and sensors) generating a slower perception of motion (like through educated conscious calculations). Moreover, the theoretical model relies on Mechanics and wavelets and may be universal. As a matter of fact, it applies to each sensory system to perform detection, prediction, and tracking.

Further, the system may detect any motion, predict and trace a path, target and insulate any moving patterns up to capture. Further, the system may be proactive in predicting incidents and accidents. Further, this is where big data streams and data analytics reach their optimal performances.

Further, the system may be scalable and fault resistant. The density of sensors, the volume for information storage and the computing power may be each individually increased. Further, the existence of a universal model originating from Physics implies the convergence to one single existing optimal solution for each field configuration. The resulting system may have the capability to be stronger than any human or group of humans in terms of supervision and control and in term of preventing intrusions, providing security.

Further, the system may use photodetection-based motion sensors. Photodetection works with synergy in three adjacent spectral bandwidths, namely the visible light, the near infrared, and the mid-infrared. The visible light enables the detection and recognition of patterns. The near-infrared enables the detection of moving or static clouds of chemicals of interest. The mid-infrared enables the detection and recognition of thermal activity, gunshots, fire, and explosions.

Further, the system may enable fast reactions to abnormal situations in the field. The system may activate with human supervision another layer of communication by sending a robot or a drone to a site of interest. The robot or the drone may be able to communicate directly to the sensors or to a local sub-router on the field and directly to the remote monitoring center bypassing the entire network of communication for fast action purpose.

Further, the motion sensor system may be energy efficient. The sensing and measurement architecture uses a minimal level of energy and may use state-of-the-art low-power sensing, amplification, and telecommunication technologies. The system may be discretely connected to a power source or have advanced capabilities to harvest energy either inside buildings collected from ambient energy like the energy radiated by electromagnetic waves or outside buildings from energy collected by small solar panels. Further, the sensors may be environmentally friendly.

Further, the system may offer a broad range of measurements and short-term and long-term statistics that may just be limited by the human imagination and that may be increased following the progression of the technology especially the computing power. Further, the system offers quite an ease of installation. Further, compared to existing systems like camera, walk-through detector, the system requires minimal installation effort. For each measurement point, the system requires to install wireless motion sensors on existing structures.

Further, the system may offer endurance. Since the sensors do not require batteries. The system may require maintenance after installation that related to training evaluation and situation updates that do not request operations to be stopped. The system may have a very long-life expectancy. The system may have low maintenance requirements.

Further, the motion sensor network may be almost invisible to the human eye. The system may have a micro-size as build with nano-technical elements. Consequently, it may be very difficult to dismantle motion sensor networks. Motion sensor systems may not be as vulnerable to depredations as video-cameras, walk-through detector, and other existing occupancy detectors can be.

The telecommunication technology and protocol of this system, as well as the energy harvesting technologies, may not be discussed in the present disclosure.

Further, the gain of the motion-intelligent system compared to any other systems may be as follows:
1. The system merges all existing motion sensors into a unique network that connects to one single artificial intelligence.
2. The system uses specific sensors that are each specialized in the task there are performing making the system the most efficient and the most effective in terms of the information that may be transported over the network:
   2.1. Motion sensors may be passive and ubiquitous sensors based on photodetection conveying high sensitivity to the changes of contrast in different useful spectral bands. Consequently, the motion sensors provide less resolution compared to video-cameras. Further, the motion sensors may lead to a three-dimensional perception of motion and to measurements of kinematical parameters which precision only depends on their density and location on the field.
   2.2. Video-cameras may be passive and localized sensors based on photodetection conveying high-resolution images with less sensitivity compared to motion sensors. Video-cameras lead to a three-dimensional perception of motion.
   2.3. Radar-Sonar sensors may be based on active and localized sensors that provide ultimately precise measurements of kinematical parameters along with some echolocation.
3. Further, the system may be universal and adaptive to any field of interest by the mix of sensors that the system may manage.
4. The system may be scalable and/or fault-tolerant:
   4.1. Overall extendable/stretchable or contractible/shrinkable by adding or substracting modules or subfields at will.
   4.2. Locally adjustable in density where sensors may be added or removed without interrupting the work of global functions.
5. Further, the system may allow the motion to be detected everywhere in the field in real time by the use of motion-specific motion sensors. Those sensors may be just activated for transmission when motion may be detected. Compared to existing motion sensors which may be occupancy sensors, those motion sensors provide enough detailed information for global recognition and all kinematical parameter estimations.
6. Further, the system may be optimal relative to the installed technologies: technology for detection, for network transmissions and for computer power (computer processing speed expressed in floating operations per second). Implementations may follow the technology advances converging to the optimal solution.
7. Further, being based on artificial intelligence and ubiquitous sensors, the system may lead to surveillance, security solutions that may be above human capabilities. As an example, a well-trained deep learning system may defeat worldwide champions on the most difficult games, for instance, the GO-game. As a matter of fact, it is estimated that the GO-game is the game that carries the largest amount of possible combinations. The amount of combination for the GO-game may be estimated at $10^{600}$ which is higher than the number of atoms in the universe, a number estimated in the range of $10^{83}$.

Further, the present disclosure presents a distributed system that performs motion analysis through the fusion of different sources data. The sources of interest may be composed of at least two major components as follows:
1. A network of motion sensors.
2. Multiple video-cameras.

Further, in this approach, the task of motion analysis may be divided into specialties: a network to sense motion and the video cameras to provide high-resolution images. Other types of sensors may be added to the system depending on the application and how far the system may be integrated with other existing applications.

As a reminder, four categories of sensors may be as follows: 1. sensor network, 2. video-camera, 3. active motion-measurement devices, 4. specialized walk-through sensors. Further, a mix of sensors depends on the application. But none of those four categories may achieve by itself a thorough and/or optimal motion control of the field. A mix of the motion sensor network and video-camera may be required for motion perception and representation in "3D+T". When bats and dolphins proceed in the capture phase, a precise measurement process of echolocation must take place. The number of video-cameras in the network depends on the required level of high resolution that may be needed with respect to the amount of traffic. A comparison may be drawn for instance with a toll road traffic surveillance. For instance, in order to control the global traffic, a few elevated cameras with far-reaching fields of view may be satisfactory. Further, in order to recognize each individual vehicle, one video-camera with the appropriate focus may be necessary for each lane passing the control booths. Further, the video-cameras may be necessary in order to capture either high resolution or high traffic. High traffic takes place in large halls when numerous people may converge at the same place and same moment for transportation (stations, airports), concerts, social gatherings. Further, the trade-off of using video-camera versus a sensor networks is a design parameter different for each local area or subfield and depends on the amount of information requested to be collected and transmitted to the remote monitoring center. Buildings, parking garages, and tunnels usually support less traffic than a train station hall.

Further, applications of intelligent-motion fields aim at performing motion analysis, supervision, and control on a given physical field. Physical fields of interest may be split into three main categories which are the following:
1. Motion-intelligent Military and environment fields.
2. Motion-intelligent buildings.
3. Motion-intelligent cities.

The following will address the three applications and develop the specificities.

In a military or environmental application, the field of interest to be explored for its movement content may be considered as totally inaccessible, either momentarily or permanently. For instance, such fields may include combat zones in the hand of the enemy, adverse fields that may not be visited because of existing radioactive sources or sensitive fields that may be averted to human visitors.

Figure 14:
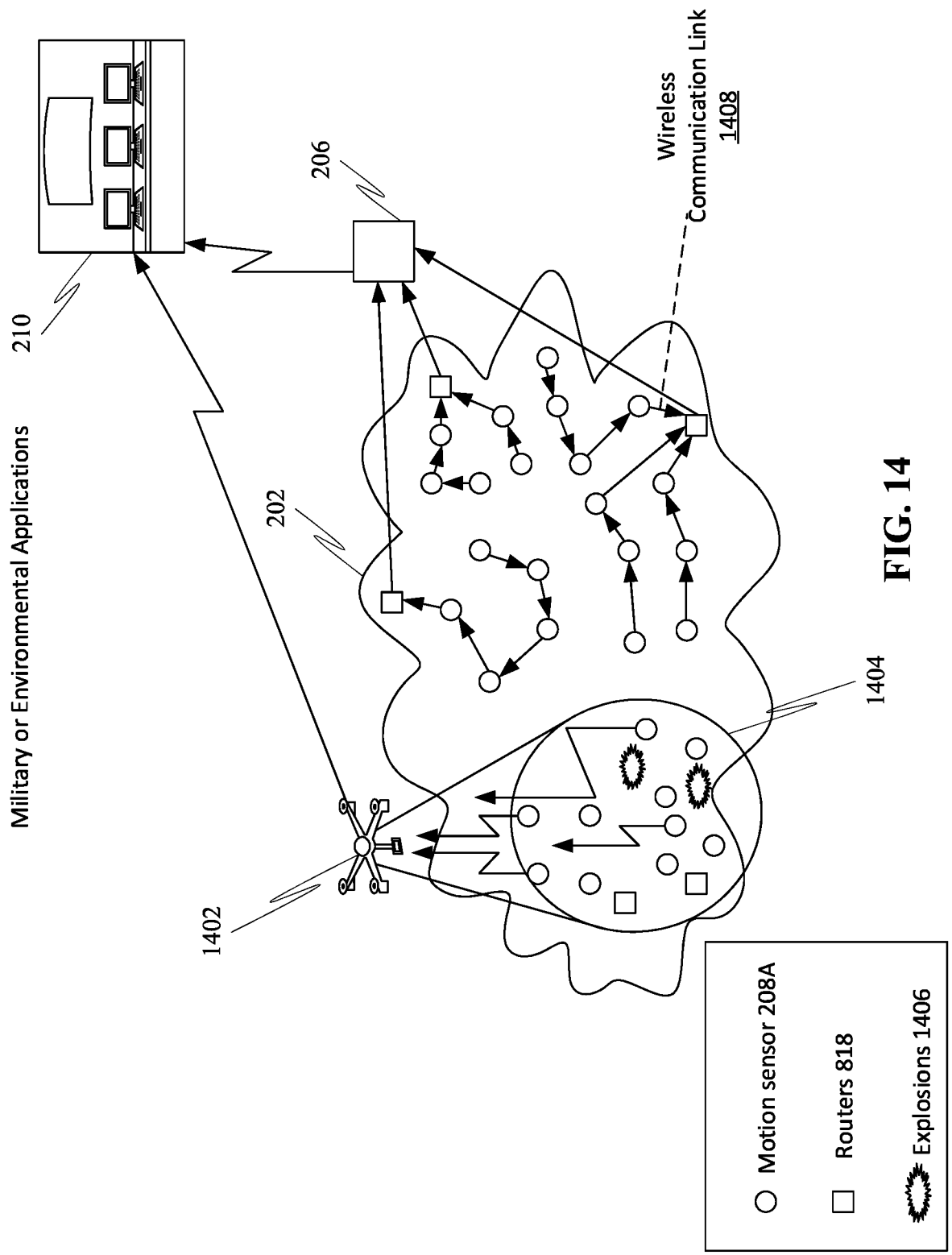
FIG. 14 shows an exemplary representation of military and environmental motion-intelligent system, in accordance with some embodiments.

In a typical application, as shown in FIG. 14, some drones (such as a drone 1402) may be equipped with video cameras spread motion sensors, referred to be motion sensors (such as the motion sensor 208A), as needed on the field of interest 1404 of an environment 202. Further, the drones (such as a drone 1402) may support several functions as follows:
1. Identifying the active sensors.
2. locating of the position of the active sensors on the field (such as the field of interest 1404) by triangulation and using the drown GPS information.
3. Relaying to a remote-control center (such as the remote monitoring center 210) all data collected from the motion sensor network.
4. Relaying to a remote-control center (such as the remote monitoring center 210) all data collected from potential any other type of sensors.
5. Sending and all data from the video cameras on the drones (such as a drone 1402) and any other sensors on the field.

Further, the drones (such as a drone 1402) may have the ability to move and to focus cameras on the targets of interest.

Motion sensors (such as the motion sensor 208A) may be built with a spherical shape equipped of photo-detectors to cover 360 degrees on in all directions. Photo-detectors may be implemented to mimic insect vision made with thousands of individual photo-receptor units. Compound eyes possess a very large view angle and high sensitivity to detect fast motion, and in some cases, the polarization of light. Moreover, insects may adapt to the nocturnal vision and dimmed lights and cover the near and mid-infrared. Therefore, the motion sensor 208A may be implemented as photo-detectors potentially able to sense motion in one or several bands out of the following three spectral bands, namely the visible spectrum, the near-infrared and the mid-infrared. Further, the motion sensors (such as the motion sensor 208A) may be photo-detectors that may selectively detect and discriminate among the following sources or moving patterns:
1. Source of heat like fire, explosions 1406, fire shots.
2. Thermal powered engines or mobiles.
3. Humans and animals.
4. On-going leaks and spreading of specific chemicals like ammonia, methane, and freons.

Further, the near infrared (NIR) region spans the range from 750 to 2,500 nm. The spectral signatures of chemicals arise from overtones and combination bands of O—H, N—H, C—H, and S—H stretching and bending vibrations. The "thermal imaging" region spans from 3,000 to 15,000 nm. This spectral range in which sensors may obtain a completely passive image of objects only slightly higher in temperature than the background room temperature. For example, the human body can be pictured based on thermal emissions only and requiring no illumination such as the sun, moon, or infrared illuminator. This region from 8,000 to 15,000 nm is also called the "thermal infrared".

Each motion sensors (such as the motion sensor 208A, as show in FIG. 14) may also be equipped with some basic signal processing and information storage capabilities, batteries, and wireless communications (through which the motion sensor 208A may make a wireless communication link 1408 with the router 818, and/or other neighboring motion sensors, as shown in FIG. 14). Further, the motion sensors (such as the motion sensor 208A) may be able to transfer their information to drones (such as the drone 1402) through a fast communication mode and/or to other neighboring motion sensors and/or routers through a slow communication mode:
1. Communications between the motion sensor 208A and the drone 1402 may be on a single-hop basis to transmit data in a fast way to the remote monitoring center 210. In this case, the information corresponds to on-going movements of interest, therefore Information has to be transmitted on real time.
2. Communications between motion sensors may be performed on a multi-hop basis potentially to a router, then from routers to a gateway that relays the information to the remote monitoring center with some delay. This second transmission support may be redundant to the first one working as a watch system awaiting action to take place and also as a back-up system in case of failure of the fast communication mode.

Those two modes of communication divide the field into an active subfield and a passive subfield.

At the remote monitoring center 210, the raw incoming data provided by the gateways 206 may be processed in two steps. The first step consists in data reconciliation, and a reconstruction of the field in 3D by fusion of all information originating from the different sensors scattered on the field which are:
1. The motion sensors (such as motion sensor 208A),
2. The video cameras,
3. Other sensors (infrared sensors, microwave or ultrasonic detectors and radars, radioactivity and chemical sensors, etc.)

and the data initially acquired that describes the topography of the field. This stage involves a so-called inverse problem that estimates the motion parameters of interest from the data produced by the sensor network. The operations that may be performed are as follows:
1. Motion detection.
2. Motion-oriented classification & selection.
3. Estimation of kinematical parameters.

The motion-oriented classification may allow to classify by scale, velocity, orientation, and position and discriminated among human, animals, and motor-powered engines of different kinds. The system may recognize among fire, explosions 1406, and gun-shots. At this stage, human intervention may be required to interpret the scene and make selections. The human intervention further works to provide feedback on the system of video cameras to focus on areas of interest. Feedback on the sensor network may also be activated to add new sensors in areas of interest or in areas where the inverse problem may require to be consolidated with a higher sampling density. Consolidation is necessary to provide existing, unique and stable solutions to the current analysis process.

The second step involves a motion analysis performed by a deep learning neural network in forms of a dual control approach in order to predict, track and construct trajectories of interest. The algorithm compares two or more inputs to select the optimal action of the Q-learning function. One input may be provided by an analysis computed from motion models known from theoretical mechanics. The second input is produced by a neuro-dynamic programming algorithm following the path learned by the system at from the previous training. At this stage, other information may be introduced as produced by any additional but useful additional sensors as mentioned earlier (acoustic, laser).

Figure 12:
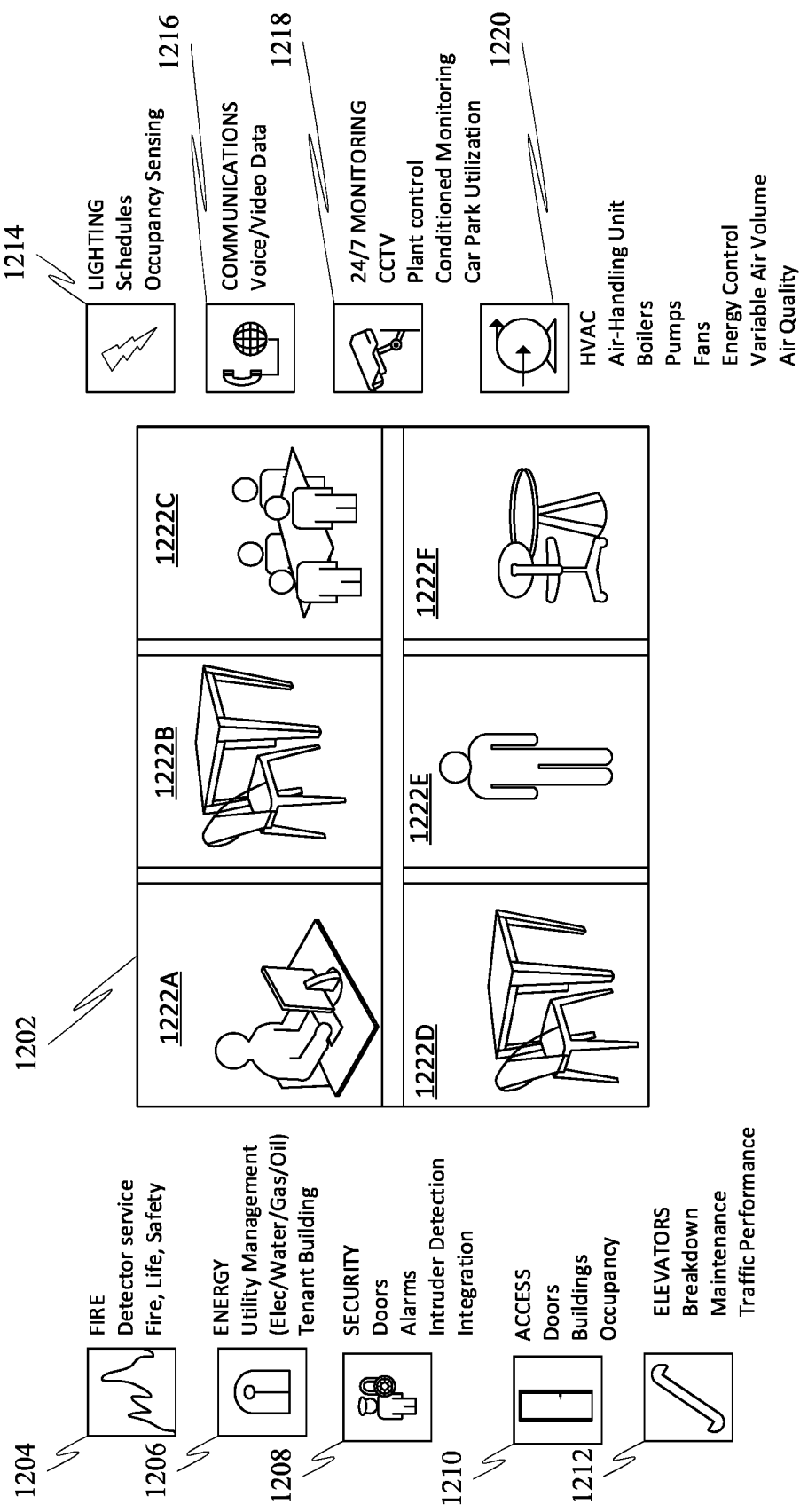
FIG. 12 shows an exemplary representation of existing sensors in buildings for IoT, in accordance with some embodiments.

Further, the deployment of sensor networks in buildings (such as a building 1202, as shown in FIG. 12) may be a new way to improve how these buildings may be operated and serviced. Sensor data streams coupled with data analytics applied in real time offer significant potential for just-in-time service delivery and cost savings. Aggregated data from various sensor types enables insight into patterns and correlations and may be exploited for building and workplace optimization, energy cost savings and rightsizing of maintenance interventions. Sensors provide permanent monitoring of ambient conditions and activities inside and outside buildings. The data flowing from connected sensors is captured in a big data platform that allows easy storage and search of large data volumes. Existing sensors are presented in FIG. 12. Further, the building 1202, in an instance, may include a number of sections and/or rooms such as room 1222A, 1222B, 1222C, 1222D, 1222E, 1222F. Further, the existing sensors in the building 1202, in an instance, may be used in the area such as, but not limited to, fire 1204, energy 1206, security 1208 (including alarms, intruder detection), Access 1210 (such as doors), elevators 1212, lighting 1214, communication 1216, 24/7 monitoring CCTV1218, HVAC 1220 etc. Further, smart sensors and smart scenarios improve building management as follows:
1. Rightsizing of service delivery by the just-in-time triggering of work orders based on people activity, the frequency of utilization, events, alarms, and needs.
2. Improving customer satisfaction through pro-active interventions.
3. Saving energy through tuning of installations.
4. Improving building performances with the detection and analysis of trends and patterns in the collected data.

Furthermore, the Internet of Things (IoT) may have changed the perspective of future building designs. Smart buildings will enable to know through occupancy sensors how many people are present at a specific floor and in a room. But the present disclosure may enable to know much more, for example to trace a path associated with people through the building. Therefore, proper measures may be taken at the time when abnormal behavior occurs or when an emergency situation appears. Eventually, better measures may be taken for safety and security. Leveraging the concept of IoT, through a variety of sensors, has made possible to control building doors, elevators, fans, lights and any devices consuming electricity. Indeed, the deployment of low cost energy meters, connected sensors, positioning tags and mobile devices combined with the introduction of big data analytics, the building control is becoming responsive and even predictive. Restated in other words, the buildings are becoming smart.

Figure 13:
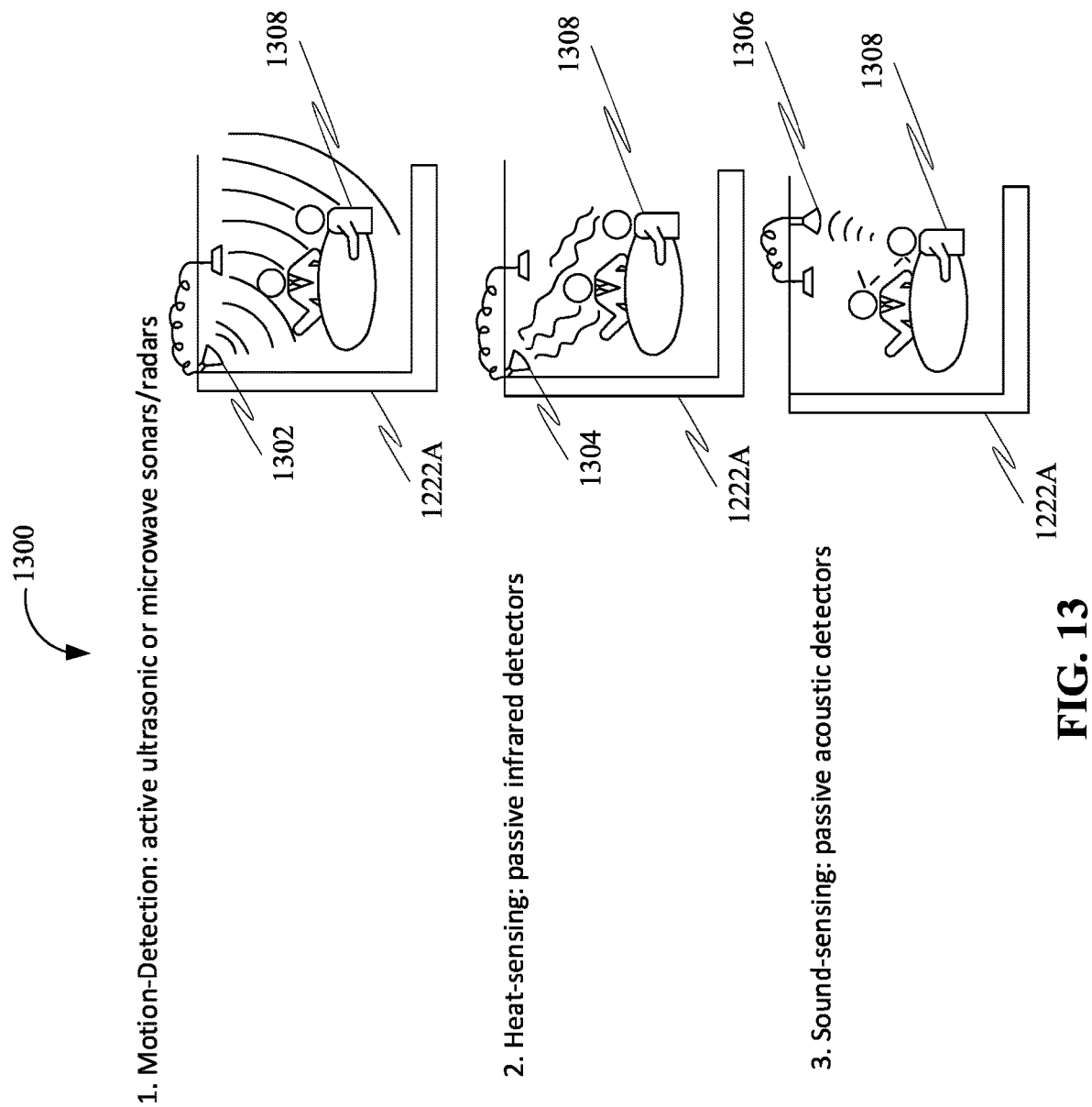
FIG. 13 shows an exemplary representation of occupancy sensors in buildings connectable to the IoT, in accordance with some embodiments.

Further, with reference to FIG. 13, existing occupancy sensors (such as occupancy sensor 1300) that may be available at a macros-size level belong to different types as follows:
1. Security systems have been developed devices that passively measure room and space occupancy. Some other devices proceed further and are able to actively measure speed and direction. Those systems may be useful tools to be introduced to strengthen the system described in this project. The occupancy systems may be categorized as follows.
    1.1 Passive Infrared Sensor 1304 (PIR sensor), as shown in FIG. 13, may be an electronic sensor that may measure infrared (IR) light radiating from objects in its field of view. It works on heat difference detection. Inside the device is a pyroelectric sensor which may detect the sudden presence of objects (such as humans 1308) who radiate a temperature different from the temperature of the background, such as the room temperature of a wall. They are most often used in PIR-based motion detectors.
    1.2 Another type of systems may be based on the infrared beam technology which consists of a collection of laser beam detectors that are well-positioned across the field to detect any movements. If well designed, any moving patterns will interrupt the directional beam between a transmitter and the corresponding receiver.
    1.3 Ultrasonic sensors (such as an ultrasonic sensor 1302) may be active detectors similar to radar. These devices make measurements based on the Doppler shift principle. The ultrasonic sensor 1302 sends high frequency sound waves in area and check for their reflected patterns. If the reflected pattern is changing continuously, then the ultrasonic sensor 1302 may assume that there may be occupancy. In a similar way to radar and sonar, ultrasonic transducers may further evaluate targets by interpreting the reflected signals. The distance of an object may be calculated by measuring the time between sending a signal and receiving the echo. The directional speed may be estimated through the Doppler frequency shift which may be proportional to the speed differential.
    1.4 Microwave sensors (such as a microwave sensor 1306) may be similar to the ultrasonic sensors, the microwave sensor 1306 also works on the Doppler shift principle. A microwave sensor 1306 may send high frequency microwaves in an area and may check for their reflected patterns. If the reflected pattern is changing continuously then the microwave sensor 1306 assumes that there is occupancy and the lighting load connected is turned on. If the reflected pattern is the same for a preset time, then the microwave sensor 1306 may assume there is no occupancy and the load is switched off. The microwave sensor 1306 may have high sensitivity as well as detection range compared to other types of sensors.
2. Occupancy information may be issued from another broad system of sensors that includes the following devices.

1. Environmental sensors, such as temperature, humidity and CO2 sensors, which detect the change in the environment due to the presence of a human.
2. Keycard light slots, used in a hotel energy management system to detect when a hotel room is occupied, by requiring the guest to place their keycard in a slot to activate lights and thermostats.
3. Smart meters, which work by detecting the change in power consumption patterns that exhibit distinct characteristics for occupied and vacant states.
4. Door operated switch.
5. Audio detection.

Further, this set of inputs already constitute some big data that may pass through a decision-making system from which actions could be launched from a remote location. Real-time data analytics performed on those data enables to perform the following actions:
1. To create alerts on abnormal behavior, incidents and accidents in order to trigger a just-in-time action and emergency delivery.
2. To monitor staff performances with efficiency and effectiveness in order to reduce operating expenses.
3. To produce predictive analysis in order to detect when failure is about to fail and taking corrective action before damages occur.

The system described in the present disclosure intends to move further into the data analytics to provide a full motion analysis of the building. The present disclosure, in an instance, may endow the building with a total control of all the moving patterns which create the ultimate security system. In a fully equipped building, no moving patterns can intrude, move inside the building and leave the field without being detected by the system in real time and without being traced in position, time and velocity all along the path that was taken.

Further, with the introduction of an artificial intelligence collecting the big data, and managing the system, different motion analysis, supervision and control applications may be developed for each of those categories. Moreover, inside a building, the "3D+T" motion analysis may be easily and fully implemented for the following reasons:
1. There are always two available projection planes or surfaces where to install motion sensors. Those planes or surfaces are respectively the walls which offer vertical orientation and the ceilings which provide a horizontal or top curved structure. Having at least two different projection plans or more enables to reconstruct the motion in three-dimension.
2. The field inside a building is confined and reduces the number of moving patterns converging at a given time at the same location except for large halls.
3. The field can be divided into a hierarchy of fields and subfields that can be controlled either selecting them individually or grouping through clusters of interest.

Further, in the present disclosure, motion-intelligent buildings may be differentiated into several categories as follows:
1. Commercial, factory and industrial premises, office spaces, storage spaces.
2. Residential buildings.
3. Public, administrative buildings.
4. Transportation stations, undergrounds, airports.
5. Parking garages.
6. Medical institutions and nursing care facilities.

Further, a sensor network may be set up on the tree structure that matches the structure of the building and the surroundings. The structure shall determine a configuration that includes both the building map and the specific functionalities. Building may be divided into floors and wings, then in halls, hallways and rooms along with different specific space like entrance hall, vestibule, front desk, elevators, storage, parking garage and others.
1. Hallways and halls may be divided into sections of specific interest. Each section becomes a subfield.
2. Floors and wings may be considered as fields which may be divided as follows.
  2.1. Corridors may be subdivided into sections.
  2.2. Rooms are subfields that may be considered either individually or by clusters.
3. Spaces with specific functions: elevators, storage, parking garage, etc. which may each be subdivided.

Further, a telecommunication network may be composed of sub-routers (like one per room, per section of larger space. Sub-routers communicate to routers corresponding in larger entities. Routers communicate to one gateway.

The motion-intelligent system may be able to capture the data from:
1. Motion sensor network with sensors located on walls and ceilings.
2. Video-cameras located at key spots.
3. Occupancy sensors as itemized earlier
4. Specialty sensors such as fire detectors, radioactive source detectors, chemical detectors.

and fuse all those components to build a representation in the "3D+T" space to be appended on the topography of the field under surveillance. Overall, there may be no limitations on the variety of detector that may be connected as long as they demonstrate their usefulness in detection and predictive analysis.

Further, the systems may use a sensor that allows performing the following actions:
1. Detect motion.
2. Perform Motion-oriented classification, selection, and recognition. The sensor system may classify object by size, volume, shape, main orientation (vertical, horizontal, by the degree of inclination). Therefore, the system shall be able to discriminate among humans (adults or child), animals (pets, rodents, others).
3. Estimate kinematical parameters.
4. Predict the kinematical parameter.
5. Tracking to trace trajectories of moving patterns.
6. Focalization on patterns of interest.

Since the sensors are photodetectors that may detect light selectively in the visible, the near-infrared and in the mid-infrared spectrum, the system may selectively detect source of heat (such as fire, fired shots, explosions), thermal powered engines or mobiles, humans and animals, Presence specific chemical leaks of ammonia, methane and freons.

Further, the near infrared (NIR) region spans the range from 750 to 2,500 nm. The spectral signatures of chemicals arise from overtones and combination bands of O—H, N—H, C—H, and S—H stretching and bending vibrations. The "thermal imaging" region spans from 3,000 to 15,000 nm. This spectral range in which sensors may obtain a completely passive image of objects only slightly higher in temperature than the background room temperature. For example, the human body can be pictured based on thermal emissions only and requiring no illumination such as the sun, moon, or infrared illuminator. This region from 8,000 to 15,000 nm is also called the "thermal infrared".

Further, the system may be based on an intelligent system that may build the path or trajectory of any moving pattern from its first detection, its entry in the field, or its marking by a special detector. On the path of the pattern, shall be at least one video-camera used to perform recognition. The system may use high resolution video-cameras located at a key spot to focalize of patterns of interest, to perform a final pattern recognition out of existing data bases, and to introduce newly discovered patterns in the data base just by one taking snapshot per pattern.

The system may outline indoor and outdoor traffics on one or multiple TV screens in real time provides real-time visualization of the video-camera on the TV screen and outline the motion information for the supervisor. The supervisor may have a possibility to focalize on patterns of interest, on areas or subfields of interest, activate more detectors. The system may detect all abnormal and prohibited behaviors, accident, incidents. The set of abnormalities may be initially defined, but after operations have started, the system will be able to introduce new abnormalities, predict their occurrence giving a path to proactivity.

Since the system may control the position, the path and speed of moving patterns, it may provide visitors with internal GPS monitored by the motion-intelligent system. Visitors may be marked with such a device and also when passing a walk-through detector. If the visitor forgets the device or gets separated, the system can react. Visitors in the building may be traced even easier if they were a special batch. If the visitor separates from the batch, the system may react as an incident. This enhancement of the motion-analysis may be of crucial utility in medical institutions, government buildings, office space and more.

Ultimately the supervisor may be able to send a robot in the building or the surroundings to intercept an abnormal moving pattern or to send a drone to make observations on the outdoor field.

Each category of motion-intelligent building as itemized here above may be reviewed for specific applications:

Motion-intelligent Medical institutions would like to control motion in individual room and to distinguish between normal, abnormal and prohibited. Clustering rooms and hallways of a service, the system can recognize the path of the nursing visits, identify emerging situations, visitor behaviors. Since the motion-intelligent system may be able to locate visitors, the system may be able to provide help that allows visitors to receive at the entrance a device that marks them in the system. The device may be a cell phone with an appropriate application working with the system. The system may therefore able to orient and guide the marked visitors in the building through the elevators or stairs, the floors to their destination. In this application, the system may work as a GPS to path their way inside the building. If specific medical equipment of interest is marked, it may be easy to locate them as well as to locate patient and key personnel.

Motion-intelligent system in a parking garage may supervise and recognize all car traffic and path, pedestrian path, detect and trace intruders in real time, detect abnormal behaviors, accidents, incidents. The system may monitor the time a car stays park. On the customer side, the system may display on huge screens, at the entrances and on the different levels, the parking spots that are left available and trace the path to them when very few are left unoccupied.

Motion-intelligent system in storage may supervise the entrance, departure, trace path of visitors, recognize visitors and snap-shot the material going in and out snap shots.

Motion-intelligent in residential building may recognize resident, identify non-residents, trace paths in the corridors.

Motion-intelligent system in underground may monitor the transport traffic including speed, stops and abnormal behavior, may monitor service/maintenance teams in action, human and animal intruding the field, supervising sections at risk, make predictions, prevent accidents.

Motion-intelligent system requires camera to monitor hall with high traffic of people, but sensor stay competitive connected area with smaller traffic, restricted traffic like offices, storage and restrooms.

Motion-intelligent systems in government buildings shall record entrance and departure trace motion especially for visitors, mark visitors at walk-through detector and with marked batches.

Applications in cities may take different aspects and different specificities. Three categories of city areas may be susceptible to be equipped with motion-intelligent systems. Each category will be characterized by a different mix of video-cameras and sensor network. Those categories may be itemized as follows:

1. Motion-intelligent outdoor public spaces which include but are not limited to streets, roads, squares, beaches, parks, playgrounds, parking lots, plazas, malls.
2. Motion-intelligent underground transportation systems which include platforms, tunnels, storage and access ways.
3. Motion-intelligent intercity road including highways, bridges, and tunnels.

Further, the motion-intelligent systems may be introduced in any outdoor space with specific surveillance algorithm. Since those spaces are being open with less vertical surfaces available, the surrounds restrict the use of a sensor network and the mix of sensors may be more in favor of using video-camera but it all depends on the topography of the space and the available structures.

Further, the motion-intelligent systems based on motion sensor network and video-cameras are well adapted to monitor underground transportation since the confinement provides several projective planes are available for detection. The strategy may be two-fold relying on video-cameras for platforms and on sensor networks in tunnels. In the underground environment, walls and ceilings are available everywhere to support video-cameras, motion sensor network, active and passive sensors, and walk-through units to detect chemicals, metal or radioactive sources.

On transportation platforms and halls, the amount of traffic generates a high amount of information to be transmitted, especially to recognize people moving through up to each individual. Video-camera surveillance may be the best system to be installed due to the amount of information to collect on active/working hours. But sensor network may monitor places that have fewer traffic like storages, corridors, restrooms etc. However, after hours, at night or when closed, surveillance may rely on fewer entrance camera and the sensor network for security.

Further, the motion-intelligent systems in underground tunnels may monitor all the transport traffic including speed, direction, stops, and all abnormal behaviors. The system may monitor service or maintenance teams at work and all movements, detect and track any human or animal intruding the field, supervising tunnel sections at risk, make predictions, prevent incidents and accidents. This is a typical application for a sensor network since all entrances in a limited section of the tunnels between two consecutive (railroad) stations are in limited number. Therefore, video-cameras are necessary at each train entrance (there are usually 2, 3, but a few numbers of train entrance in a section), at the service doors for maintenance personnel and at ventilation outlets. The rest of the section may be efficiently monitored through a sensor network.

In a smart highway application, the system may be based on regularly spaced video-cameras and detectors along each side of the road. A typical presents a supervised section of a road where video cameras may be positioned at each extremity of a section and a motion sensor network may be deployed along the section on the side of road installing on post. The motion sensor system may be perfect for use on bridges, tunnels and lit sections of road since an infrastructure already exists on which to install the motion sensor with some elevation. Depending on the information to be collected, video cameras may be high elevated or close to the ground to catch snapshot of individual vehicle. Each wireless sensor communicates with roadside routers that relay the information to the gateway that connect towards the remote monitoring center.

The addition of a network of motion sensor on highways may have the following advantages over any other existing methods that are referred here above:
1. Energy efficiency. The sensing and measurement architecture uses a minimal level of energy and can use state-of-the-art low-power sensing, amplification, and telecommunication technologies. The system may harvest energy from small solar panels. The traffic sensors are energetically self-sufficient and, therefore, environmentally friendly.
2. A broad range of measurement. With the motion sensor networking architecture, numerous types of traffic measurements can be performed. Examples of some measurements include but are not limited to traffic volume and density, traffic global speed, classification and count by vehicle types (categorized by length, shape, volume). Furthermore, with a larger density sensor poles, the sensors can provide an end-to-end detailed information about vehicle trajectories, speed variation, driving abnormalities, incidents (stopping, disabled and side-stopped vehicles, any kind of defined intruders (human, animal, falling packages) and accident. The system allows to dispatch drones or patrol towards sites of interest. Further, this system depends on some weather conditions and may be more difficult to handle in case of heavy rain, but it is understandable that a highway section is such complicated and diverse field that it needs the association and synergy of different technologies to reach an optimal control.
3. Ease of installation. Compared to existing systems, the system requires minimal installation effort. For each traffic measurement point, the system requires a roadside data collection point and installing wireless motion sensors on posts (like light post). Since the motion sensors are both small and wireless, there are no lane closures time and traffic disturbances required for the installation. Moreover, installation is minimal time and not labor intensive.
4. Endurance. Since the motion sensors do not require batteries, calibration, or any other type of maintenance after installation, the system has a very long-life expectancy.
5. Low maintenance requirements. Because the measurement devices do not need wiring or batteries, their maintenance demand is minimal Further, all existing sensors installed on the highway may be communicating their information to the remote monitoring center where the artificial intelligent system may fuse all information on the topographic representation of the highway section.

The analysis that may be performed with a well-designed intelligent motion control and supervision system may be itemized as follow.

Monitoring road, highway, bridge and tunnels:
1. Classify the content of the moving traffic with the ability to discriminate in terms of cars, truck/bus, motorcycle, human, animals (different size).
2. Estimate speed, position, track and build trajectories of individual vehicle of interest.
3. Perform accurate counts on the passing traffic by vehicle category along with all requested statistics.
4. Detect traffic accidents, incidents like slowed traffic, stopped vehicles, still-stand occurrences.
5. Detect abnormalities like wrong ways, abnormal vehicles, abnormal trajectories, abnormal events, abnormal vehicle shape, abnormal behaviors and abnormal spectral reflection (near infrared content as a chemical signature), fire, explosion, and potential gunshots.
6. Send in real time rescue, maintenance, and emergency teams as well as police and close observation systems on the requesting site.

FIG. 1 is an illustration of an online platform 100 consistent with various embodiments of the present disclosure. By way of non-limiting example, the online platform 100 to facilitate motion analysis in an environment may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, and sensors 110 and actuators 112 over a communication network 114, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform.

A user 116, such as the one or more relevant parties, may access online platform 100 through a web based software application or browser. The web based software application may be embodied as, for example, but not be limited to, a website, a web application, a desktop application, and a mobile application compatible with a computing device 1500.

Figure 2:
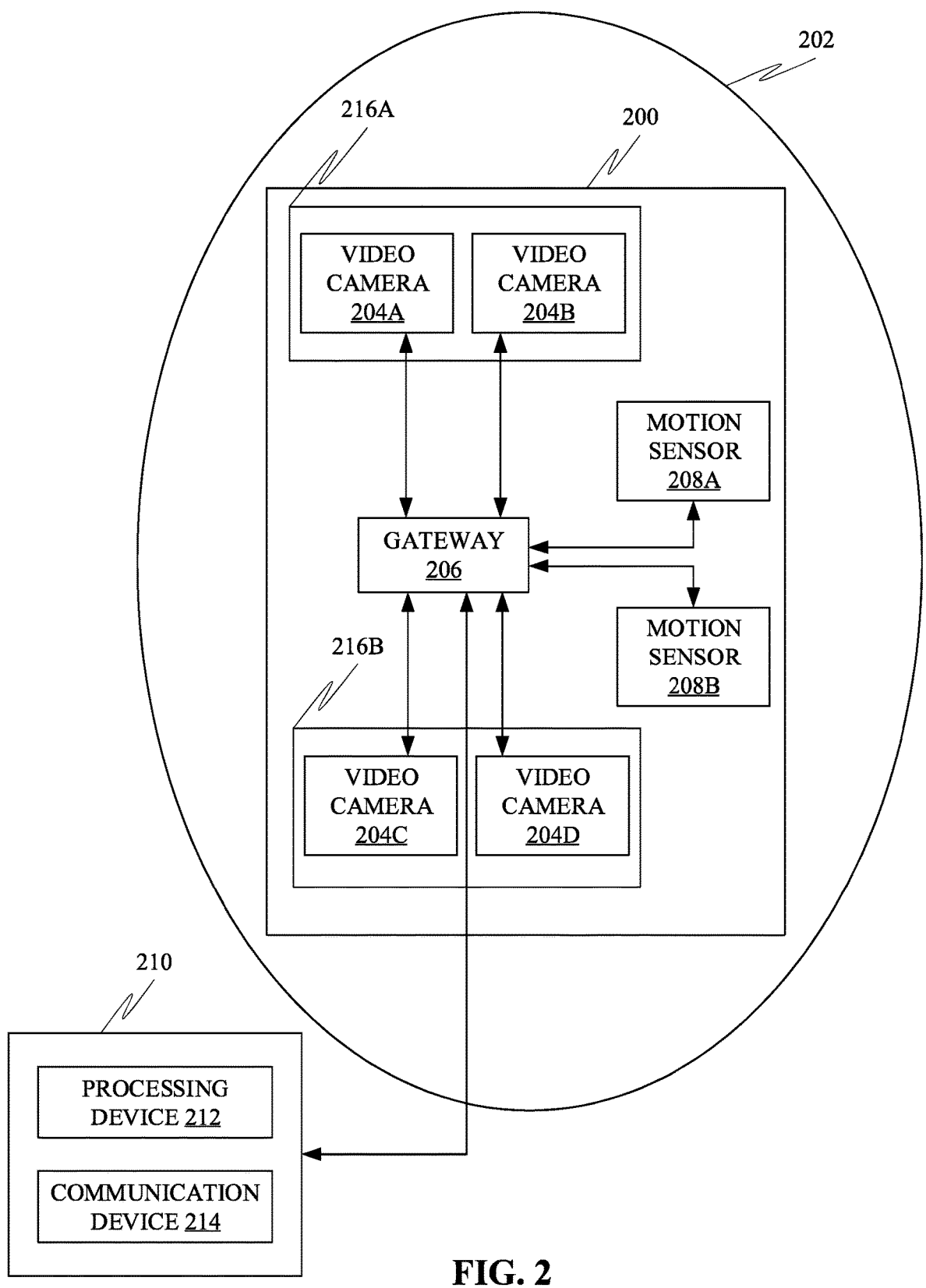
FIG. 2 shows a block diagram representation of a system configured for performing motion analysis in an environment, in accordance with some embodiments.

FIG. 2 shows a block diagram representation of a system 200 configured for performing motion analysis in an environment 202, in accordance with some embodiments. Accordingly, the motion analysis in the environment 202, in an instance, may be performed passively and/or actively by sensing electromagnetic and/or acoustic waves for which physical properties may have been transformed by any moving object. Further, the motion analysis, in an instance, may also include (but not limited to) a motion detection of moving patterns, a motion-oriented classification and/or selection on a detected moving pattern, an estimation of the kinematic parameter, a prediction of the kinematic parameter, a tracking to build trajectories of moving patterns of interest, a detection (and/or indication) and/or prediction of abnormalities (such as incidents, and accidents etc.), and/or a focusing on pattern of interest etc. Further, the system 200 may include a plurality of motions sensors 208A-B configured to be disposed in the environment 202. Further, the environment 202 may be characterized as any space that may be monitored for detecting motion. Further, the environment may include, but not limited to, commercial and business premises, residential, tunnels, public and administrative buildings, parking garages, transportation stations or undergrounds, airports, private properties, hotels, city streets, and/or battle fields etc. Further, the plurality of motion sensors 208A-B may be configured to generate a plurality of motion data corresponding to at least one motion of at least one object in the environment 202. For instance, the at least one motion may signify any change in a configuration of any physical system. The physical system, in an instance, may include, but not limited to, objects, bodies, particles of matter etc.

Further, the system 200 may include a plurality of video cameras (such as video camera 204A, 204B, 204C, and 204D) disposable at a plurality of key locations (such as key location 216A and 216B) in the environment 202. The key location 216A-B, in an instance, may be any location that may be crucial for the motion analysis. In a typical civilian application, the key location 216A at which the video camera 204A and 204B may be disposed may include, but not limited to, street poles, side walls, ceilings etc. Further, each video camera 204A-D may be configured to capture image sequences associated with a portion of the environment 202. Further, at least one video camera (such as the video camera 204A) may be configured to transmit a part of a corresponding image sequence to a remote monitoring center 210 through at least one gateway 206.

Further, the system 200 may include at least one gateway 206 disposable proximal to the environment 202. Further, the at least one gateway 206 may be configured as a two-way interface capable of communicating with the remote monitoring center 210 and the plurality of motion sensors 204A-D. Further, the remote monitoring center 210 may include a processing device 212 configured for analyzing the plurality of motion data and the image sequences. Further, the processing device 212 may be configured for generating at least one trajectory data corresponding to at least one trajectory associated with the at least one object based on the analyzing. Further, in some embodiments, the at least one trajectory data may include at least one trajectory identifier corresponding to at least one predetermined trajectory. Further, in some embodiments, the at least one trajectory data may correspond to the at least one trajectory of the at least one object. Further, in some embodiments, the at least one trajectory data may correspond to the at least one trajectory of at least a part of the at least one object. Further, in some embodiments, a trajectory data corresponding to an object may include at least one kinematic parameter associated with the object. Further, in some embodiments, the at least one kinematic parameter may include at least one of velocity, position, scale and orientation. Further, in some embodiments, the generating of the at least one trajectory data may be based on a deep learning engine. Further, the generation of one trajectory result of a dual control of a deep learning (trained from the field and a simulator, fast results) and an expert system which may control the deep learning (slower) and implement all exact models of mechanics, wave, sensors including topography, location of sensors and light sources.

Further, in some embodiments, the remote monitoring center 210 may include a communication device 214 configured for transmitting a prompt to an expert device associated with an expert. Further, the prompt may include an unclassified incident. Further, the communication device 214 may be configured for receiving a human feedback from the expert device. Further, the human feedback may include a classification data. Further, the processing device 212 may be configured for associating the plurality of motion data with the classification data. Further, the processing device 212 may be configured for training the deep learning engine based on the associating.

Further, in some embodiments, the processing device 212 may be configured for analyzing the at least one trajectory data based on at least one predetermined rule. Further, the processing device 212 may be configured for identifying at least one event of interest based on the analyzing of the at least one trajectory data. Further, in some embodiments, the event of interest may include a predetermined desirable incident, a predetermined undesirable incident, an unclassified incident, an abnormal motion and an unforeseen accident. Further, in some embodiments, the processing device 212 may be configured for identifying the at least one object based on the analyzing. Further, the identifying may include generating at least one object identifier associated with the at least one object. Further, in some embodiments, the processing device 212 may be configured for generating at least one motion signature corresponding to the at least one object based on the analyzing. Further, the identifying of the at least one object may be based on the at least one motion signature. For instance, the at least one object (such as a flying bird) may have a motion signature different from another object (such as a reptile). Further, in some embodiments, the processing device 212 may be configured for identifying at least one part of the at least one object based on the analyzing. Further, the identifying may include generating at least one object part identifier associated with the at least one part of the at least one object.

Further, in some embodiments, the processing device 212 may be further configured for generating at least one predicted motion data corresponding to a future motion of the at least one object based on the analyzing. Further, in some embodiments, the at least one predicted motion data may include at least one predicted trajectory data corresponding to at least one future trajectory associated with the at least one object. Further, in some embodiments, a predicted trajectory data corresponding to an object may include at least one predicted kinematic parameter associated with the object.

Figure 3:
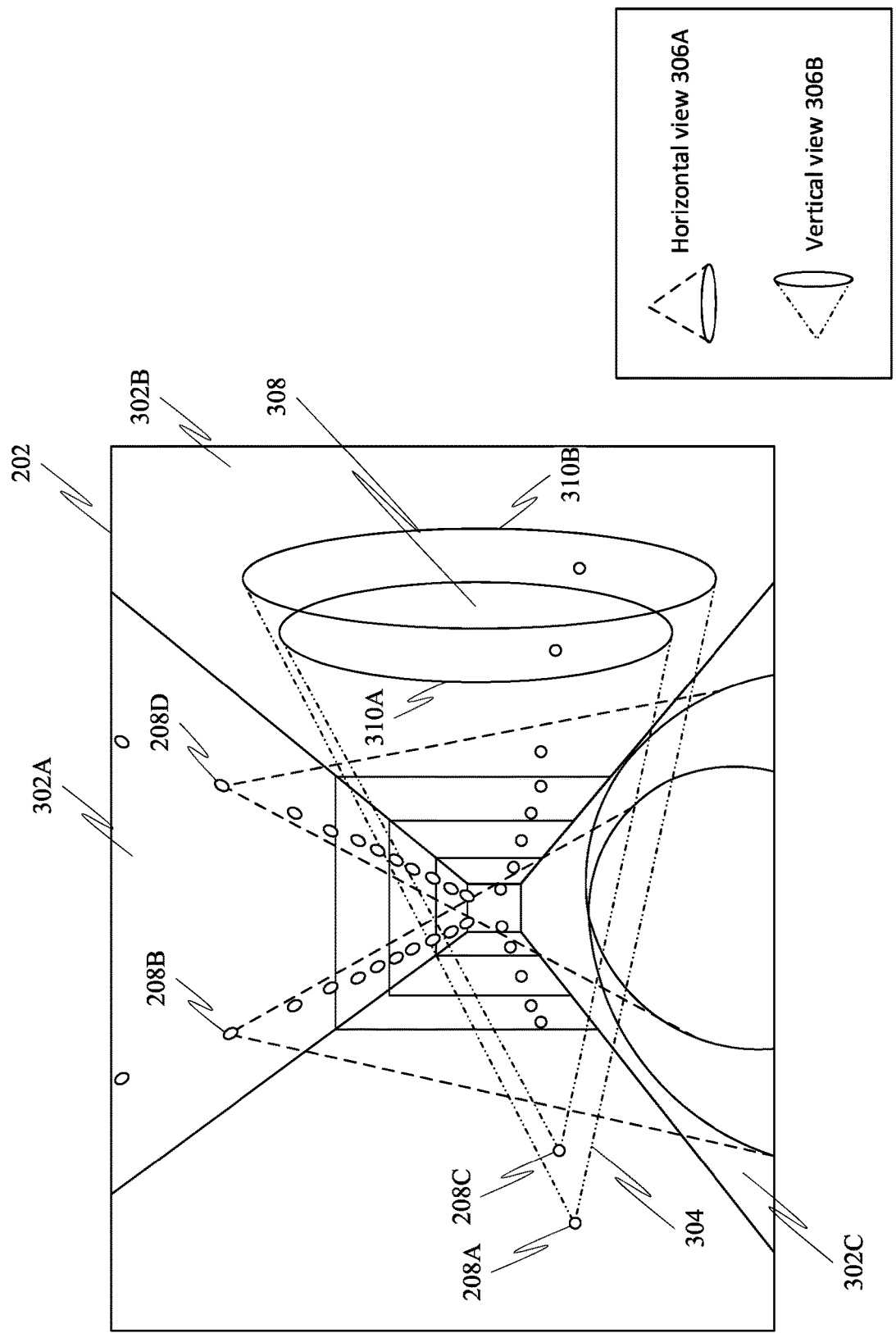
FIG. 3 shows an exemplary representation of the plurality of motion sensors disposed on the at least one surface of the environment, in accordance with further embodiments.

In further embodiments, the environment 202 may include at least one surface (such as a ceiling 302A, a wall 302B, a floor 302C, as shown in FIG. 3). Further, the environment 202, in an instance, may be a passage way of a hotel (and/or a tunnel) that may include the ceiling 302A, the floor 302C, walls (such as the wall 302B) as shown in FIG. 3. Further, the plurality of motion sensors (such as motion sensor 208A, 208B, 208C, and 208D) may be configured to be disposed on the at least one surface. FIG. 3 shows an exemplary representation of the plurality of motion sensors 208A-D disposed on the at least one surface of the environment 202. For instance, the motion sensor 208A and 208C may be disposed at a wall opposite to the wall 302B in the environment 202. Further, the motion sensor 208B and 208D may be disposed at the ceiling 302A in the environment 202.

Further, in some embodiments, the plurality of motion sensors 208A-D may be associated with a plurality of field of views (such as a horizontal view 306A, a vertical view 306B). Further, a field of view of a motion sensor (such as the motion sensor 208A) may include a spatial region 304 within which a motion of an object may be detectable by the motion sensor 208A. Further, in some embodiments, the spatial region 304 may include a three dimensional region. Further, in some embodiments, the spatial region 304 may include a one dimensional region. Further, in some embodiments, the spatial region 304 may include a two dimensional region.

Further, in some embodiments, the environment 202 may include a field of interest. Further, the field of interest defines a region of interest within which at least one motion event corresponding to at least one object may be detectable. Further, the field of interest (total environment under monitoring) may be composed of a plurality of region of interest (connected, disjointed, or, overlapping). Further, each region of interest may be comprised in one field of view or a plurality. Further, each region of the field of interest may be comprised in at least one field of view of the plurality of field of views.

Further, in some embodiments, the spatial region 304 may include a three dimensional conical region characterized by an apex point coincidental with a position of the motion sensor 208A, a height of the cone and a direction of the cone in relation to the at least one surface (such as a wall opposite to the wall 302B) on which the motion sensor 208A may be disposed. Further, in some embodiments, the direction of the cone is one of a vertical direction, a horizontal direction, and an angled direction.

Further, in some embodiments, the plurality of field of views (such as the vertical view 306B) may include at least two intersecting field of views (such as intersecting field of view 310A and 310B) characterized by at least one overlapping region (such as an overlapping region 308). Further, the at least two intersecting field of views (such as the intersecting field of view 310A and 310B) corresponds to at least two intersecting motion sensors (such as the motion sensor 208A and 208C) of the plurality of motion sensors 208A-208D. Further, a motion event occurring in the overlapping region 308 may be detectable by each of at least two intersecting motion sensors 208A and 208C.

Figure 7:
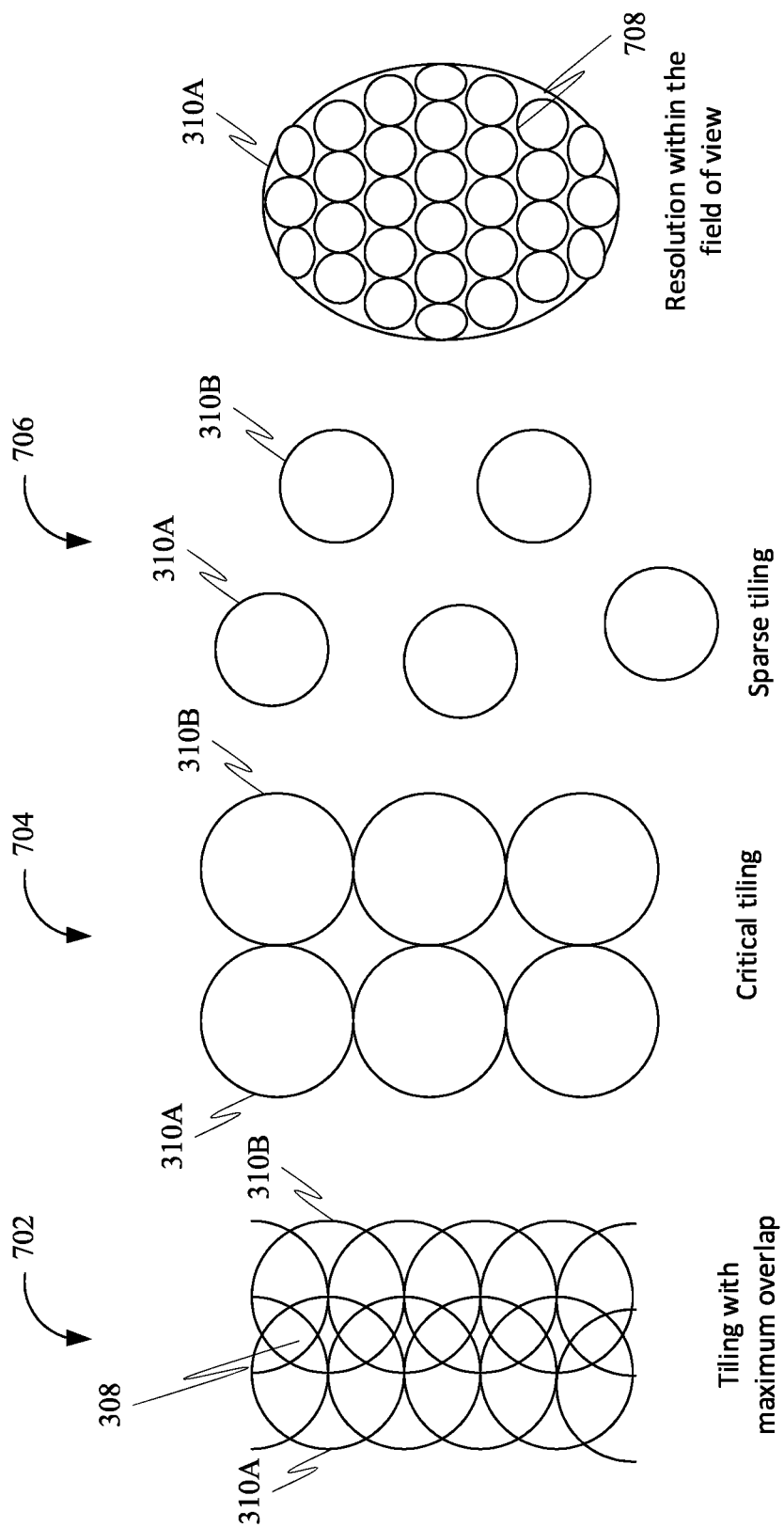
FIG. 7 shows an exemplary representation of at least two intersecting field of views for different orientation of at least two intersecting motion sensors, in accordance with some embodiments.

Further, in some embodiments, the processing device 212 may be configured for determining a probability of failure associated with a motion sensor (such as the motion sensor 208A) of the at least two intersecting motion sensors 208A and 208C. Further, the processing device 212 may be configured for determining a number of the at least two intersecting motion sensors (such as the intersecting motion sensors 208A and 208C) based on the probability of failure. Further, the plurality of motion sensors 208A-D may include the number of the at least two intersecting motion sensors 208A and 208C. Further, with reference to FIG. 7, the at least two intersecting motion sensors (such as the motion sensor 208A and 208C) may be oriented (tilted) in a way such that the at least two intersecting field of views (such as intersecting field of view 310A and 310B) may result in a maximum overlap 702, or a critical overlap 704, and/or a sparse overlap 706. For instance, the maximum overlap 702 may include the overlapping region 308 that may cover a maximum area. Further, in another instance, the critical overlap 704 may include the at least two intersecting field of views (such as intersecting field of view 310A and 310B) characterized without any overlapping region 308. Further, in another instance, the sparse overlap 706 may include the at least two intersecting field of views (such as intersecting field of view 310A and 310B) that may be placed at a significant distance from each other with no overlapping region 308. Further, in some embodiments, a resolution associated with the intersecting field of view 310A may be determined by the processing device 212, which may be dependent on a number of photodetectors (such as a photodetector 708) pilling-up in an array.

Figure 4:
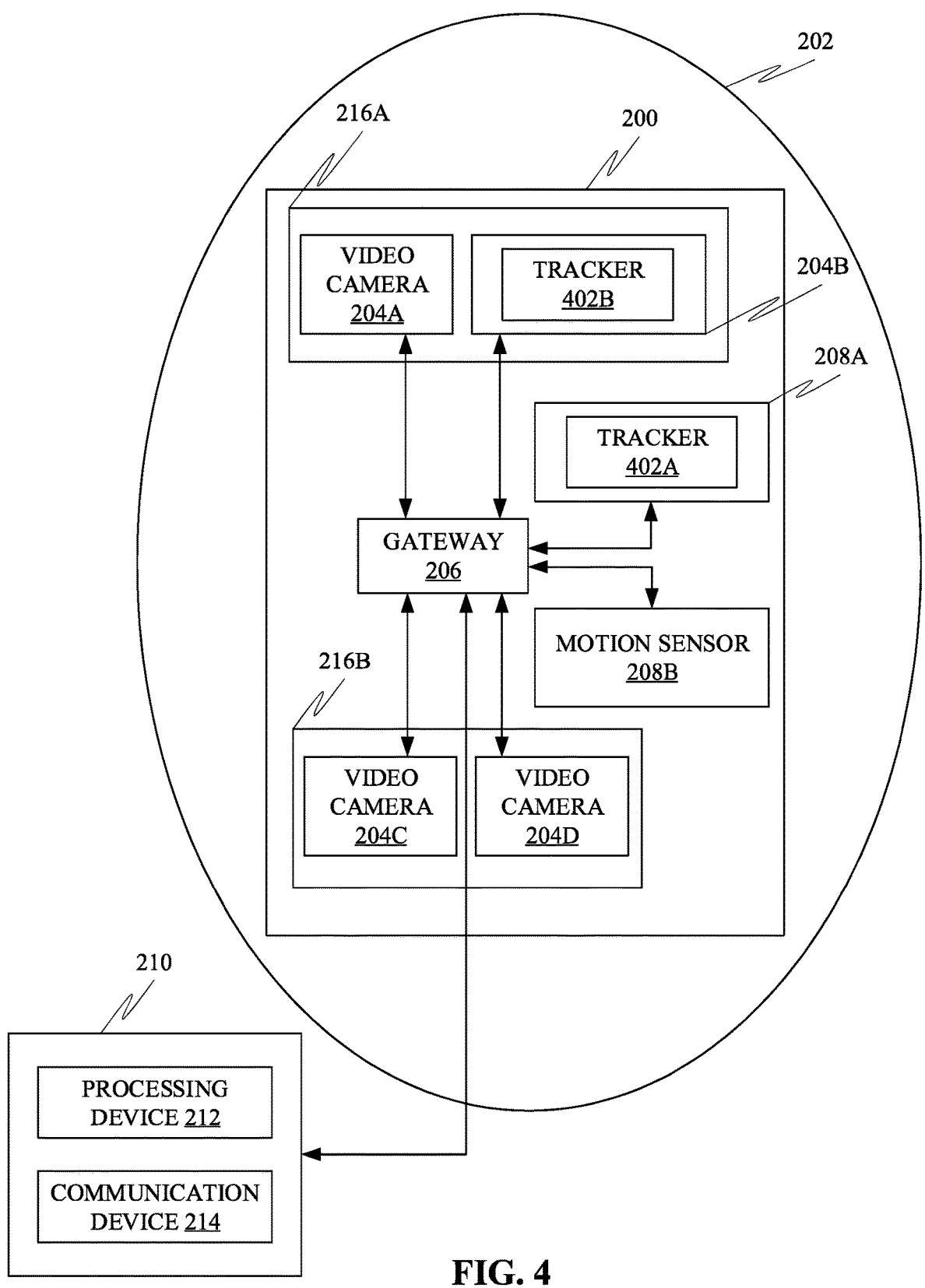
FIG. 4 shows an exemplary representation of the system that may include at least one tracker, in accordance with some embodiments.

FIG. 4 shows an exemplary representation of the system 200 that may include at least one tracker (such as a tracker 402A and a tracker 402B), in accordance with some embodiments. Further, the processing device 212 may be configured for activating at least one tracker (such as the tracker 402A) based on identifying of the at least one event. Further, the at least one tracker (such as the tracker 402A) may be configured for controlling at least one operational state of the plurality of motion sensors (such as the motion sensor 208A) in order to track the at least one object associated with the event of interest. Further, in some embodiments, the at least one operational state may include at least one of an active state, a sampling rate, a sampling time instant, a directionality associated with the motion sensor 208A, a detection range associated with the motion sensor 208A and a proximity between the motion sensor 208A and the at least one object. Further, in some embodiments, the tracker 402A may be embedded within the motion sensor 208A. Further, in some embodiments, the tracker 402B may be configured for controlling at least one operational state of the plurality of video cameras (such as the video camera 204B) in order to track the at least one object associated with the event of interest. Further, in some embodiments, the at least one operational state may include at least one of an active state, a sampling rate, a sampling time instant, a directionality associated with the video camera 204B, a detection range associated with the video camera 204B and a proximity between the video camera 204B and the at least one object. Further, in some embodiments, the tracker 402B may be embedded within the video camera 204B.

Figure 5:
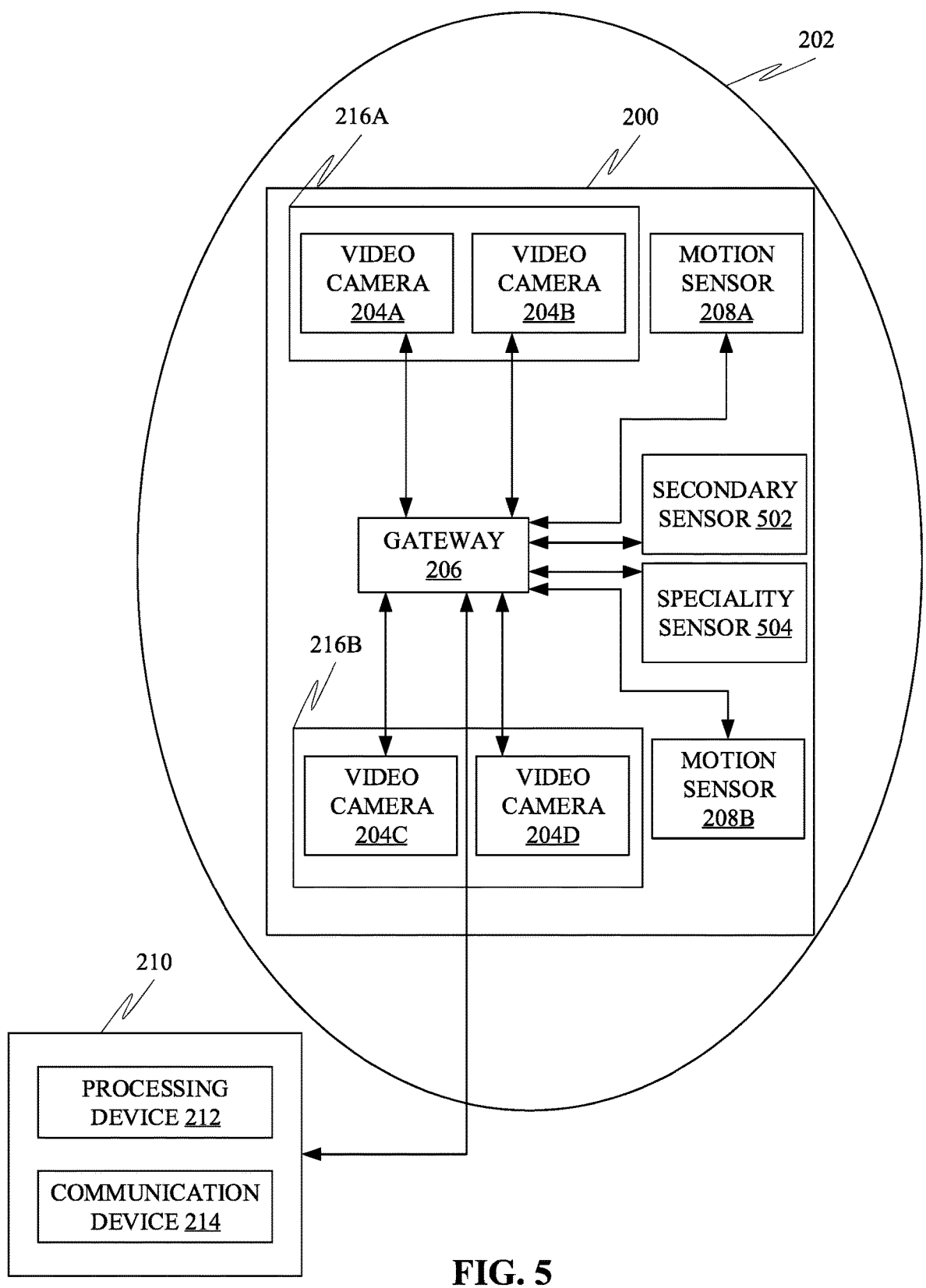
FIG. 5 shows an exemplary block diagram representation of the system that may include at least one secondary sensor, and at least one specialty sensor, in accordance with some embodiments.

FIG. 5 shows an exemplary block diagram representation of the system 200 that may include at least one secondary sensor 502, and at least one specialty sensor 504, in accordance with some embodiments. Further, the processing device 212 may be configured for activating at least one secondary sensor 502 based on the identifying of the at least one event of interest. Further, the at least one secondary sensor 502 may be disposed in the environment 202. Further, the at least one secondary sensor 502 may be communicatively coupled to the at least one gateway 206. Further, the at least one secondary sensor 502 may be configured for capturing secondary sensor data corresponding to the environment 202. Further, the at least one secondary sensor 502 may be configured for capturing secondary sensor data associated with the at least one object.

Further, in some embodiments, the at least one secondary sensor 502 may be configured for capturing at least one characteristic of the at least one object. Further, the at least one characteristic may be undetectable by each of the plurality of motion sensors 208A-B. Further, in some embodiments, the at least one secondary sensor 502 may include at least one secondary motion sensor (not shown in FIG. 5) configured for sensing secondary motion data corresponding to the at least one object. Further, in some embodiments, the at least one secondary motion sensor may be active. Further, in some embodiments, the plurality of motion sensors 208A-D may be passive. Further, in some embodiments, the at least one secondary sensor 502 may include an emitter configured for emitting energy and a receiver configured for receiving a reflection of the energy from the at least one object. Further, in some embodiments, the emitter may include at least one of an ultrasonic emitter, an infrared emitter, a UV emitter and a microwave emitter. For instance, the at least one secondary sensor 502 may include an acoustic detector for detecting a motion in a gas plant. The acoustic detector, in an instance, may hear a gas leak by analyzing a distinct ultrasound emitted by a pressurized gas leak across a widest spectrum of frequencies.

Further, in some embodiments, the secondary motion data may be associated with the at least one motion of the at least one object. Further, in some embodiments, a secondary sampling rate associated with the secondary motion data may be greater than a primary sampling rate of the plurality of motion data. Further, in some embodiments, a secondary spatial density of the at least one secondary sensor 502 may be greater than a primary spatial density of the plurality of motion sensors 208A-B. Further, in some embodiments, a secondary resolution associated with the secondary motion data may be greater than a primary resolution associated with the plurality of motion data. Further, in some embodiments, a secondary power consumption of the at least one secondary sensor 502 may be greater than a primary power consumption of the plurality of motion sensors 208A-B. Further, in some embodiments, a secondary computing metric associated with analyzing the secondary sensor data may be greater than a primary computing metric associated with analyzing the plurality of motion data. Further, in some embodiments, a secondary entropy level associated with the secondary motion data may be greater than a primary entropy level of the plurality of motion data. Further, the processing device 212 may be configured for analyzing the secondary sensor data. Further, the processing device 212 may be configured for generating at least one insight associated with the at least one object based on the analyzing of the secondary sensor data. Further, in some embodiments, the system 200 may include at least one specialty sensor 504 configured for detecting at least one predetermined substance in the environment.

Figure 6:
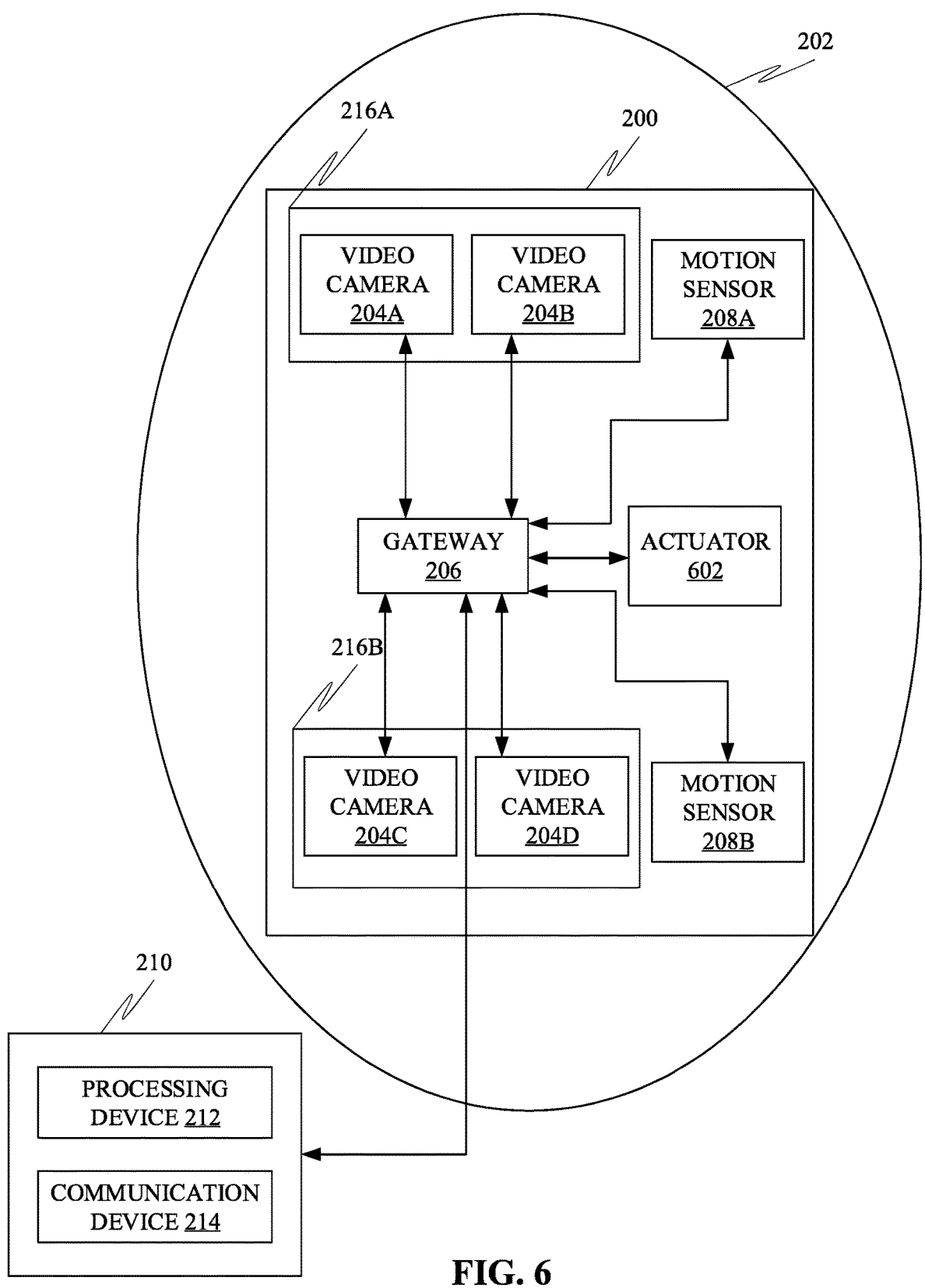
FIG. 6 shows an exemplary block diagram representation of the system that may include at least one actuator, in accordance with further embodiments.

FIG. 6 shows an exemplary block diagram representation of the system 200 that may include at least one actuator 602, in accordance with further embodiments. Further in some embodiments, the processing device 212 may be configured for performing at least one action based on the analyzing of the plurality of motion data. Further, in some embodiments, the performing of the at least one action may be based on the analyzing of the at least one trajectory data. Further, in some embodiments, the performing of the at least one action may be based on the identifying of the at least one event of interest. Further, in some embodiments, the at least one action may include actuating at least one actuator 602 disposed in the environment 202. Further, in some embodiments, the at least one actuator 602 may include an alerting device. Further, in some embodiments, the at least one actuator 602 may include an environmental variable controlling device. Further, in some embodiments, the at least one actuator 602 may include a physical access controlling device. Further, in some embodiments, the at least one action may include transmitting at least one notification to at least one user device. Further, the at least one user device, in an instance, may be any device that may be configured to communicate with the system 200. Further, the user device, in an instance, may be configured to provide an interface to the user in order to interact with the system 200. Further, the user device, in an instance, may include (but not limited to) a smartphone, a smartwatch, a laptop, a PC etc.

Figure 15:
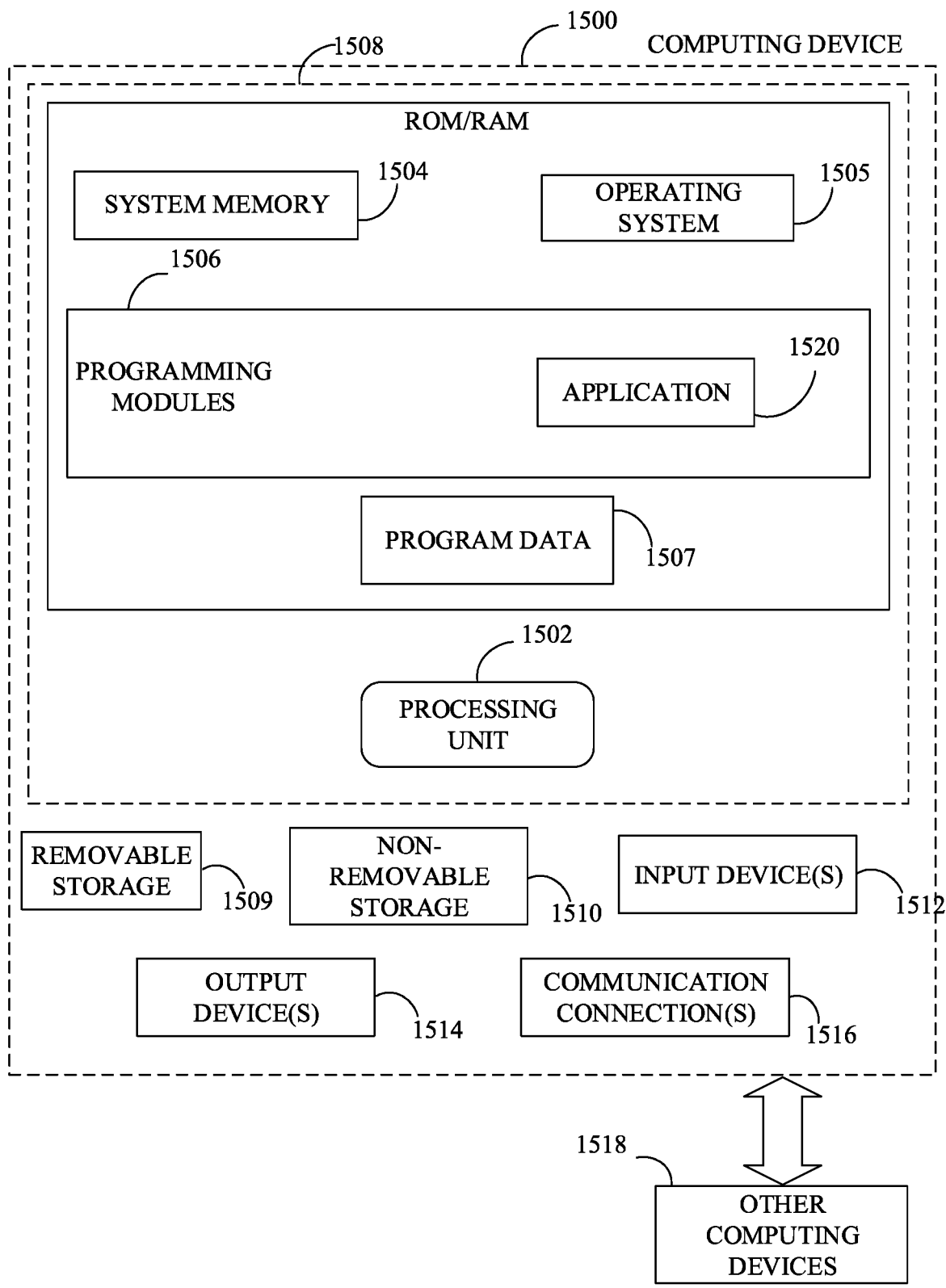
FIG. 15 is a block diagram of a computing device for implementing the methods disclosed herein, in accordance with some embodiments.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g. random-access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image-processing module, machine learning module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and non-volatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520 such as a media player) may perform processes including, for example, one or more stages of methods, algorithms, systems, applications, servers, databases as described above. The aforementioned process is an example, and processing unit 1502 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The invention claimed is:

1. A system configured for performing motion analysis in an environment, wherein the system comprises:
   a plurality of motions sensors configured to be disposed in the environment, wherein the plurality of motion sensors is configured to generate a plurality of motion data corresponding to at least one motion of at least one object in the environment;
   a plurality of video cameras disposable at a plurality of key locations in the environment, wherein each video camera is configured to capture image sequences associated with a portion of the environment, wherein at least one video camera is further configured to transmit a part of a corresponding image sequence to a remote monitoring center through at least one gateway; and
   at least one gateway disposable proximal to the environment, wherein the at least one gateway is configured as a two-way interface capable of communicating with the remote monitoring center and the plurality of motion sensors, wherein the remote monitoring center comprises a processing device configured for:
      analyzing the plurality of motion data and the image sequences; and
      generating at least one trajectory data corresponding to at least one trajectory associated with the at least one object based on the analyzing;
   wherein the plurality of motion sensors is associated with a plurality of field of views, wherein a field of view of a motion sensor comprises a spatial region within which a motion of an object is detectable by the motion sensor;

wherein the spatial region comprises a three dimensional conical region characterized by an apex point coincidental with a position of the motion sensor, a height of the cone and a direction of the cone in relation to an at least one surface on which the motion sensor is disposed;

wherein the plurality of field of views comprises at least two intersecting field of views characterized by at least one overlapping region, wherein the at least two intersecting field of views corresponds to at least two intersecting motion sensors of the plurality of motion sensors, wherein a motion event occurring in the overlapping region is detectable by each of at least two intersecting motion sensors;

wherein the processing device is configured for:
  determining a probability of failure associated with a motion sensor of the at least two intersecting motion sensors; and
  determining a number of the at least two intersecting motion sensors based on the probability of failure;
wherein the plurality of motion sensors comprises the number of the at least two intersecting motion sensors.

2. The system of claim 1, wherein the environment comprises at least one surface, wherein the plurality of motion sensors is configured to be disposed on the at least one surface.

3. The system of claim 1, wherein the environment comprises a field of interest, wherein the field of interest defines a region of interest within which at least one motion event corresponding to at least one object is detectable, wherein each region of the field of interest is comprised in at least one field of view of the plurality of field of views.

4. The system of claim 1, wherein the generating of the at least one trajectory data is based on a deep learning engine.

5. The system of claim 1, wherein the remote monitoring center further comprises a communication device configured for:
  transmitting a prompt to an expert device associated with an expert, wherein the prompt comprises an unclassified incident;
  receiving a human feedback from the expert device, wherein the human feedback comprises a classification data;
wherein, the processing device is further configured for:
  associating the plurality of motion data with the classification data; and
  training the deep learning engine based on the associating.

6. The system of claim 1, wherein the processing device is further configured for:
  analyzing the at least one trajectory data based on at least one predetermined rule; and
  identifying at least one event of interest based on the analyzing of the at least one trajectory data.

7. The system of claim 1, wherein the processing device is further configured for activating at least one tracker based on identifying of the at least one event, wherein the at least one tracker is configured for controlling at least one operational state of the plurality of motion sensors in order to track the at least one object associated with the event of interest.

8. The system of claim 1, wherein the processing device is further configured for activating at least one secondary sensor based on the identifying of the at least one event of interest, wherein the at least one secondary sensor is disposed in the environment, wherein the at least one secondary sensor is communicatively coupled to the at least one gateway, wherein the at least one secondary sensor is configured for capturing secondary sensor data corresponding to the environment, wherein the at least one secondary sensor is configured for capturing secondary sensor data associated with the at least one object, wherein the processing device is further configured for:
  analyzing the secondary sensor data; and
  generating at least one insight associated with the at least one object based on the analyzing of the secondary sensor data.

9. The system of claim 8, wherein a secondary entropy level associated with the secondary motion data is greater than a primary entropy level of the plurality of motion data.

10. The system of claim 8, wherein the at least one secondary sensor is configured for capturing at least one characteristic of the at least one object, wherein the at least one characteristic is undetectable by each of the plurality of motion sensors.

11. The system of claim 1, wherein the processing device is further configured for performing at least one action based on the analyzing of the plurality of motion data.

12. The system of claim 11, wherein the at least one action comprises actuating at least one actuator disposed in the environment.

13. The system of claim 11, wherein the at least one action comprises transmitting at least one notification to at least one user device.

14. The system of claim 1, wherein the processing device is further configured for identifying the at least one object based on the analyzing, wherein the identifying comprises generating at least one object identifier associated with the at least one object.

15. The system of claim 1, wherein the processing device is further configured for generating at least one predicted motion data corresponding to a future motion of the at least one object based on the analyzing.

16. The system of claim 1 further comprising at least one specialty sensor configured for detecting at least one predetermined substance in the environment.

* * * * *